(12) United States Patent
Sashihara

(10) Patent No.: US 8,223,701 B2
(45) Date of Patent: Jul. 17, 2012

(54) COMMUNICATION APPARATUS, COMMUNICATION SYSTEM, AND METHOD AND PROGRAM FOR JUDGING RESERVATION ACCEPTANCE

(75) Inventor: Toshiyuki Sashihara, Minato-ku (JP)

(73) Assignee: NEC Corporation, Tokyo (JP)

( * ) Notice: Subject to any disclaimer, the term of this patent is extended or adjusted under 35 U.S.C. 154(b) by 733 days.

(21) Appl. No.: 12/276,859

(22) Filed: Nov. 24, 2008

(65) Prior Publication Data

US 2009/0135776 A1    May 28, 2009

(30) Foreign Application Priority Data

Nov. 27, 2007    (JP) ................. 2007-305202

(51) Int. Cl.
*H04W 4/00* (2009.01)
(52) U.S. Cl. .................. 370/329; 370/230; 370/252
(58) Field of Classification Search .......... None
See application file for complete search history.

(56) References Cited

U.S. PATENT DOCUMENTS 6,163,700 A * 12/2000 Hussain et al. ............. 455/453
2003/0028656 A1 * 2/2003 Babka ...................... 709/229
2006/0013229 A1 * 1/2006 Johansson et al. ....... 370/395.41
2008/0313638 A1 * 12/2008 Ohura et al. ................ 718/104

FOREIGN PATENT DOCUMENTS

| JP | 2004-266713 A | 9/2004 |
| JP | 200527305 A | 1/2005 |
| JP | 2006115291 A | 4/2006 |
| WO | 2006107558 A2 | 10/2006 |

OTHER PUBLICATIONS

Office Action issued Apr. 17, 2012 in corresponding Japanese application No. 2007-305202.

* cited by examiner

*Primary Examiner* — Ricky Ngo
*Assistant Examiner* — David Oveissi
(74) *Attorney, Agent, or Firm* — Sughrue Mion, PLLC

(57) ABSTRACT

A communication apparatus of the present invention is a communication apparatus which accepts a resource reservation, and includes at least a resource reservation acceptance judging portion for accepting a resource reservation request from a communication apparatus which performs a resource reservation. The resource reservation acceptance judging portion performs acceptance of a reservation based on a resource use probability obtained from a resource reservation state and a resource use state of an own communication apparatus of at least one of the communication apparatuses which perform resource reservations.

18 Claims, 26 Drawing Sheets

| REQUESTER ADDRESS | MEAN DATE RATE | RESOURCE USE STATE | RESERVATION DEADLINE |
|---|---|---|---|
| STA 1 | 64 Kbps | reserved | 2007/1/27 22:45:00.000.000 |
| STA 2 | 8 Kbps | reserved | 2007/1/27 22:45:10.000.000 |
| STA 3 | 64 Kbps | reserved | 2007/1/27 22:45:20.000.000 |
| STA 4 | 8 Kbps | reserved | 2007/1/27 22:45:30.000.000 |
| STA 5 | 64 Kbps | in use | — |
| STA 6 | 8 Kbps | in use | — |
| ••• | ••• | ••• | ••• |

FIG. 4

| REQUESTER ADDRESS | MEAN DATE RATE | RESOURCE USE STATE | RESERVATION DEADLINE |
|---|---|---|---|
| STA 1 | 64 Kbps | reserved | 2007/1/27 22:45:00.000.000 |
| STA 2 | 8 Kbps | reserved | 2007/1/27 22:45:10.000.000 |
| STA 3 | 64 Kbps | reserved | 2007/1/27 22:45:20.000.000 |
| STA 4 | 8 Kbps | reserved | 2007/1/27 22:45:30.000.000 |
| STA 5 | 64 Kbps | in use | – |
| STA 6 | 8 Kbps | in use | – |
| ... | ... | ... | ... |

FIG. 5

| REQUESTER ADDRESS | RESOURCE RESERVATION FREQUENCY | USE FREQUENCY |
|---|---|---|
| STA 1 | 10 | 9 |
| STA 2 | 15 | 13 |
| STA 3 | 8 | 7 |
| STA 4 | 25 | 22 |

F I G. 6
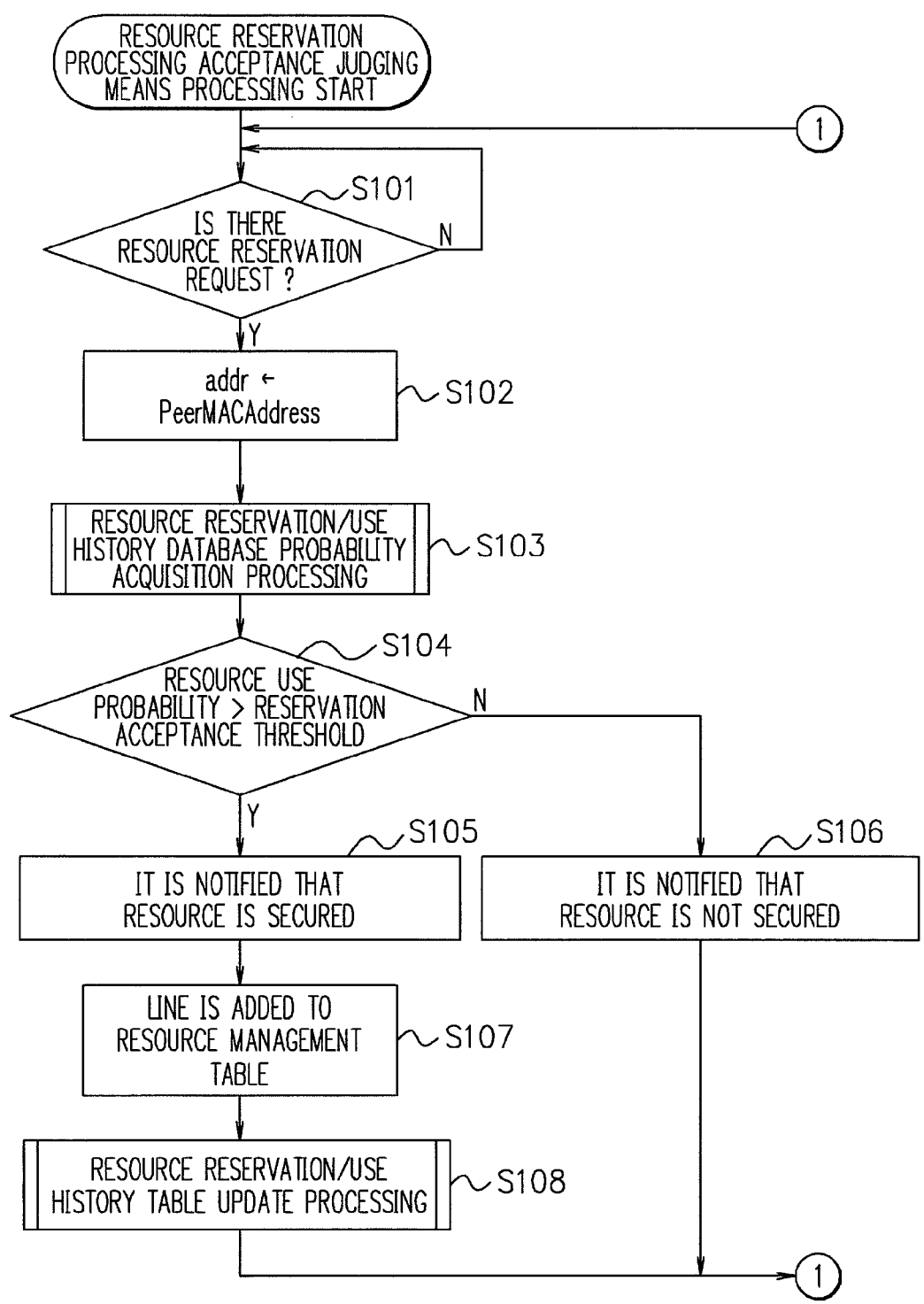

F I G. 11

| UPPER USE PROBABILITY | RESERVATION ACCEPTANCE PROBABILITY |
|---|---|
| 1 | 1 |
| 0.8 | 0.9 |
| 0.6 | 0.5 |
| 0 | 0.3 |

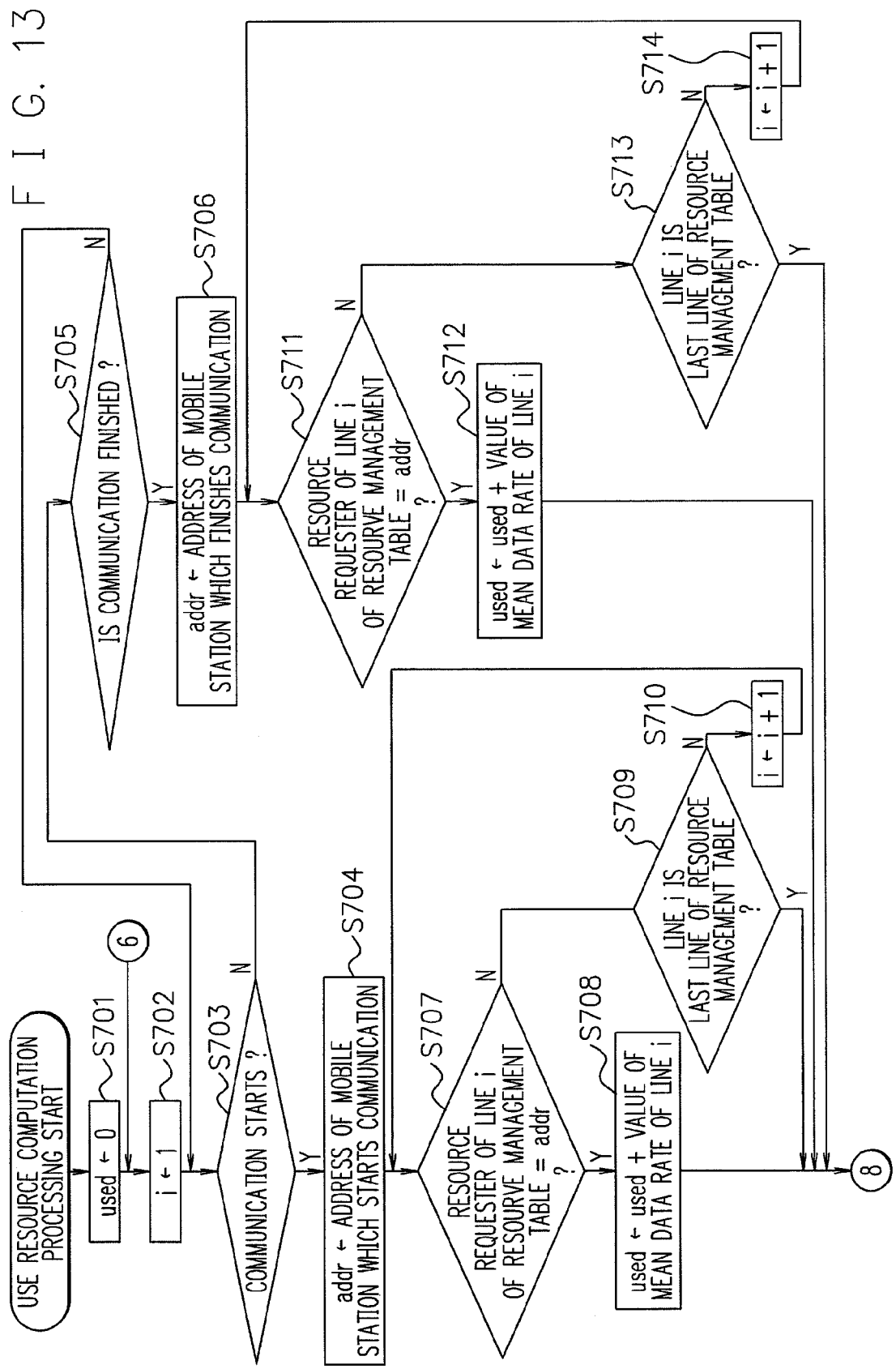

F I G. 14B
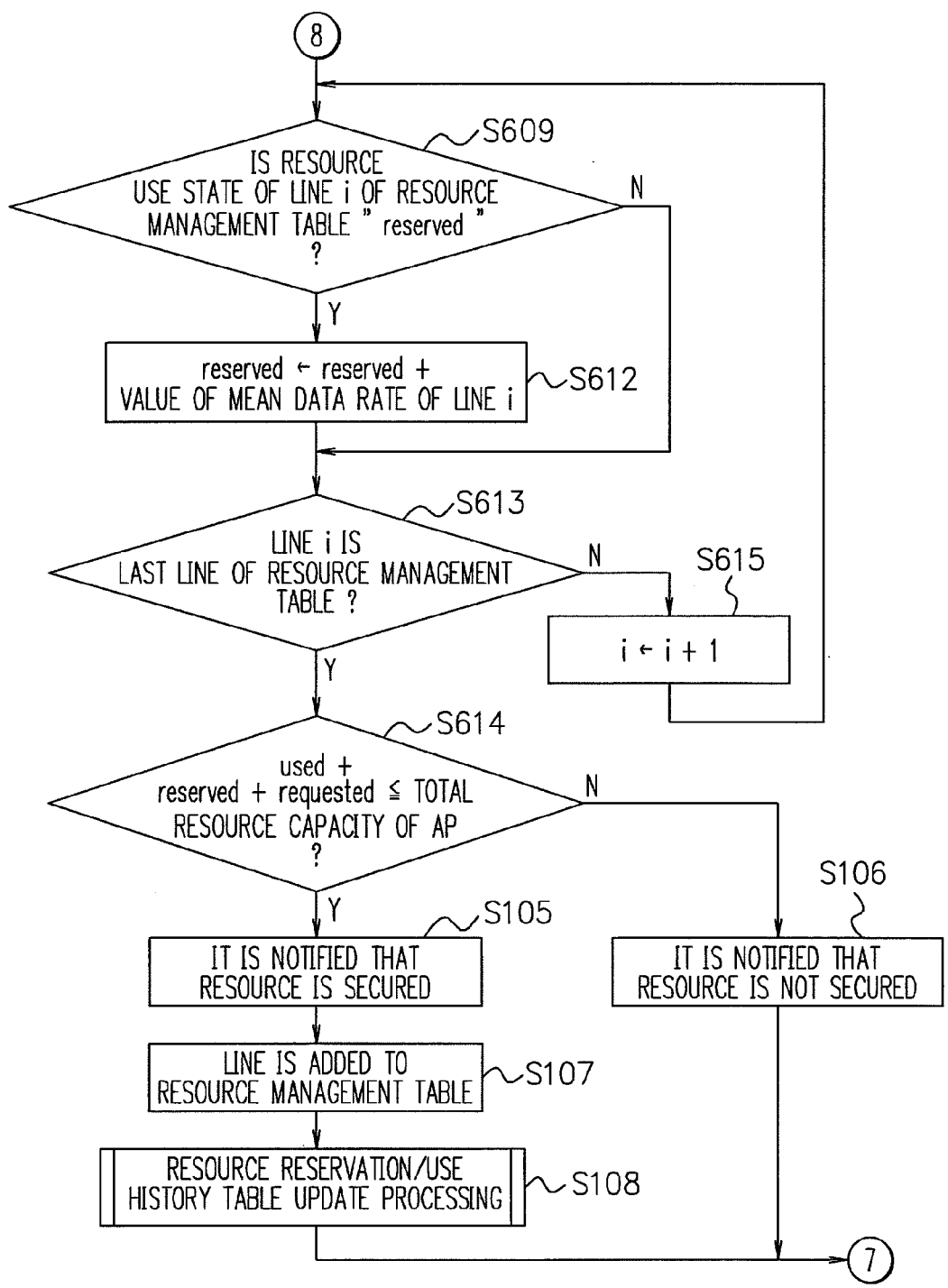

F I G. 15
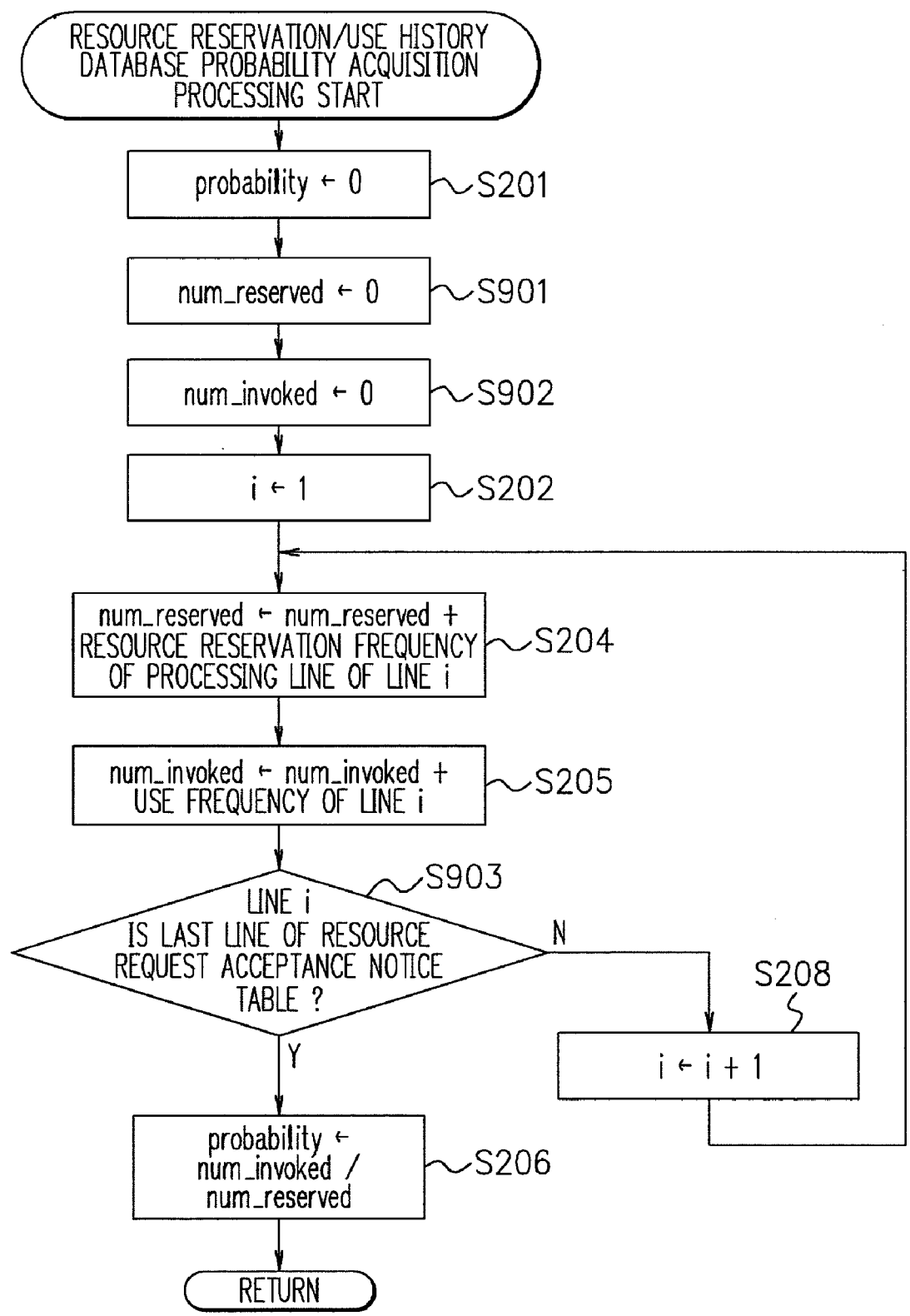

F I G. 16

| REQUESTER ADDRESS | MEAN DATA RATE | RESOURCE RESERVATION FREQUENCY | USE FREQUENCY |
|---|---|---|---|
| STS 101 | 64 kbps | 10 | 9 |
| STS 102 | 64 kbps | 15 | 13 |
| STS 103 | 8 kbps | 8 | 7 |
| STS 104 | 8 kbps | 25 | 22 |

F I G. 19

| MEAN DATA RATE | ACCEPTANCE THRESHOLD |
|---|---|
| 8 kbps | 0.9 |
| 32 kbps | 0.8 |
| 64 kbps | 0.7 |
| 128 kbps | 0.6 |

F I G. 22

| REQUESTER ADDRESS | RESERVED CAPACITY | USED CAPACITY |
|---|---|---|
| STA 1 | 256 kbps | 230 kbps |
| STA 2 | 128 kbps | 100 kbps |
| STA 3 | 64 kbps | 50 kbps |
| STA 4 | 2560 kbps | 1280 kbps |

F I G. 23

| REQUESTER ADDRESS | COMMUNICATION RATE |
|---|---|
| STS 101 | 50 kbps |
| STS 102 | 32 kbps |
| STS 103 | 7 kbps |
| STS 104 | 5 kbps |

COMMUNICATION APPARATUS, COMMUNICATION SYSTEM, AND METHOD AND PROGRAM FOR JUDGING RESERVATION ACCEPTANCE

This application is based upon and claims the benefit of priority from Japanese patent application No. 2007-305202, filed on Nov. 27, 2007, the disclosure of which is incorporated herein in its entirety by reference.

BACKGROUND OF THE INVENTION

1. Field of the Invention

The present invention relates to an apparatus and a system for performing a reservation of a communication resource.

2. Description of Related Art

In a conventional wireless local area network (LAN), a mobile station could not reserve a resource to an access point of a handover destination in advance before performing a handover from a current access point which a mobile station is currently using to another access point. Here, a resource represents, for example, power used according to a communication rate, a memory capacity, a frequency band, or a communication rate itself. Therefore, when a handover occurs, if an access point of a handover destination cannot secure a resource necessary to maintain a communication, a handover fails.

However, due to the IEEE (The Institute of Electrical and Electronics Engineers) 802.11r standard, even in a wireless LAN, it is possible to reserve a communication resource to an access point in advance before a handover. As a result, the handover fail probability is decreased.

A handover specified in the IEEE 802.11r standard (Draft 7.0) will be described below with reference to FIGS. 1 and 2.

FIG. 1 is a diagram illustrating a configuration of a wireless LAN system. The wireless LAN system of FIG. 1 includes a mobile station 111, a plurality of access points 101 to 107 to which the mobile station 111 have access by a wireless communication, and an authentication server 131 which performs authentication that the mobile station 111 is a mobile station authorized to access a network of a mobility domain, and the access points 101 to 107 and the authentication server 131 are connected via a wire line network.

FIG. 2 is a sequence diagram illustrating a handover sequence specified in the IEEE 802.11r standard (Draft 7.0). It is assumed that the mobile station 111 is under control of the access point 103, is communicating with the access point 103 and is moving toward the access point 104 as shown in FIG. 1. At this time, in order to reserve a resource to the access point 104 in advance, the mobile station 111 first transmits an 802.11 Authentication Request (201). The access point 104 replies an 802.11 Authentication Response to the mobile station 111 (202). After receiving the frame, the mobile station 111 transmits an 802.11 Authentication Confirm frame which contains information such as a request resource capacity such as a mean data rate, a minimum data rate and a peak data rate (203). The access point 104 replies an 802.11 Authentication ACK frame which contains an answer for representing whether to accept a resource reservation or not (204).

If a resource request of the mobile station is accepted, frame exchange for an advance reservation is finished, but if a resource request of the mobile station is not accepted, the mobile station can change a desired resource capacity and then retry to request a resource reservation to the access point 104. Thereafter, if the mobile station issues a Reassociation Request 205 till a Reassociation Deadline indicated in an Authentication ACK frame notified from an access point during a Fast BSS Transition Initial Mobility Domain Association to be performed with an access point existing when the mobile station 111 enters a mobility domain 141 for the first time, a resource reserved through the 802.11 Authentication Confirm frame 203 becomes effective, so that the mobile station 111 can communicate with the access point 104 by using the resource (e.g., see, IEEE 802.11r standard, Draft 7.0, July 2007, Section 11A 6, Pages 61 to 67). The access point 104 transmits a Reassociation Response 206 in response to the Reassociation Request 205.

In Japanese Patent Application Laid-Open (JP-A) No. 2004-266713 (pages 4 to 9), disclosed is a technique that, while performing a handover, a mobile station performs a reservation directly or through another base station to as many base stations as the number of reservation base stations determined based on a priority unique to a mobile station. If a mobile station requests a reservation directly to a base station, a mobile station individually transmits reservation information to as many base stations as the number of base stations. If another base station is used, a mobile station transmits reservation information containing the number of reservation base stations to a base station with which it is communicating, and the base station which has received the reservation information selects as many neighboring base stations as the number of reservation base stations and transmits the reservation information to them. Each base station which has received a reservation request directly from a mobile station or through another base station compares a resource capacity requested by a mobile station to its available resource capacity, and accepts a reservation if an available resource capacity is equal to or more than a request resource capacity and rejects a reservation receipt if an available resource capacity is less than a request resource capacity.

SUMMARY

However, in a mobile communication system disclosed in JP-A No. 2004-266713 (pages 4 to 9), a base station judges whether to accept a resource reservation or not by comparing a request resource capacity of a mobile station to its available resource capacity. A mobile station hands over to a single base station among a plurality of reserved base stations, and whether to accept a reservation or not is judged by comparing an available resource capacity of a single base station to a request resource capacity. Since a resource capacity which other mobile stations can reserve or use is decreased by a resource capacity for which a reservation is made, if a certain mobile station reserves resources of a plurality of base stations, the number of mobile stations which can request a resource reservation to a base station is decreased or the number of base stations to which a mobile station can request a reservation is decreased, whereby there is a problem in that a resource reservation cannot be effectively made.

Therefore, the present invention is devised to resolve the above problems, and it is an object of the present invention to provide a communication system, a communication apparatus, a method, and a program which can efficiently make a resource reservation.

In order to achieve the above object, the present invention has the following features.

In order to achieve the above object, the present invention provides a communication apparatus which accepts a resource reservation, including: at least a resource reservation acceptance judging portion for accepting a resource reservation request from a communication apparatus which performs a resource reservation, wherein the resource reservation acceptance judging portion performs acceptance of a reservation based on a resource use probability obtained from a resource reservation state and a resource use state of an own communication apparatus of at least one of the communication apparatuses which perform resource reservations.

In order to achieve the above object, the present invention also provides a communication system, including: at least one communication apparatus which performs a resource reservation; and at least one communication apparatus which accepts a resource reservation, wherein the communication apparatus which accepts a resource reservation performs acceptance of a reservation based on a resource use probability obtained from a resource reservation state and a resource use state of an own communication apparatus of at least one of communication apparatuses which perform resource reservations.

In order to achieve the above object, the present invention also provides a method for judging acceptance of a resource reservation in a communication apparatus which accepts a reservation, including: judging acceptance of a reservation based on a resource use probability obtained from a resource reservation state and a resource use state of an own communication apparatus of a communication apparatus which performs a resource reservation.

In order to achieve the above object, the present invention also provides a method for judging acceptance of a reservation in a communication system which includes at least one communication apparatus which performs a resource reservation, and at least one communication apparatus which accepts a resource reservation, the method comprising: judging acceptance of a reservation based on a resource use probability obtained from a resource reservation state and a resource use state of an own communication apparatus of a communication apparatus which performs a resource reservation.

In order to achieve the above object, the present invention also provides a program for executing processing in an information processing apparatus, including: executing reservation acceptance processing of a resource of a communication apparatus which accepts a reservation, based on a resource use probability obtained from a resource reservation state and a resource use state of an own communication apparatus of a communication apparatus which performs a resource reservation to the information processing apparatus.

BRIEF DESCRIPTION OF THE DRAWINGS

FIG. 4 shows one example of a resource management table stored in a resource management database 313 according to the first exemplary embodiment of the present invention;

FIG. 5 shows one example of a resource reservation/use history table stored in a resource reservation/use history database 314 according to the first exemplary embodiment of the present invention;

FIG. 6 is a flowchart illustrating an operation of a resource reservation acceptance judging means 311 according to the first exemplary embodiment of the present invention;

FIG. 11 shows one example of a resource reservation acceptance probability table according to the second exemplary embodiment of the present invention;

FIG. 13 is a flowchart illustrating one example of use resource computation processing according to the third exemplary embodiment of the present invention;

FIG. 15 is a flowchart illustrating an operation of resource reservation/use history database probability acquisition processing according to a fifth exemplary embodiment of the present invention;

FIG. 16 shows one example of a resource reservation/use history table according to a sixth exemplary embodiment of the present invention;

FIG. 19 shows one example of a reservation threshold table contained in a threshold database 401 according to the seventh exemplary embodiment of the present invention;

FIG. 22 shows one example of a resource reservation/use history table contained in a resource reservation/use history database 314 according to the eighth exemplary embodiment of the present invention;

FIG. 23 shows one example of a communication rate table contained in a communication rate database 502 according to the eighth exemplary embodiment of the present invention;

EXEMPLARY EMBODIMENT

First Exemplary Embodiment

In a first exemplary embodiment of the present invention, a communication apparatus which accepts a resource reservation performs reservation acceptance based on a resource use probability.

Hereinafter, a communication apparatus which accepts a reservation is referred to as an access point, and a communication apparatus which performs a reservation is referred to as a mobile station. The first exemplary embodiment of the present invention will be described as an example focusing on a wireless LAN system which includes an access point and a mobile station.

The resource use probability is obtained for each mobile station based on a source reservation state and a resource use state of a mobile station which is a communication apparatus which performs a resource reservation. Here, the resource use probability is obtained, for example, by dividing the number of times that a mobile station has used a resource before a reservation deadline by the number of times that a mobile station has requested a reservation.

Figure 1:
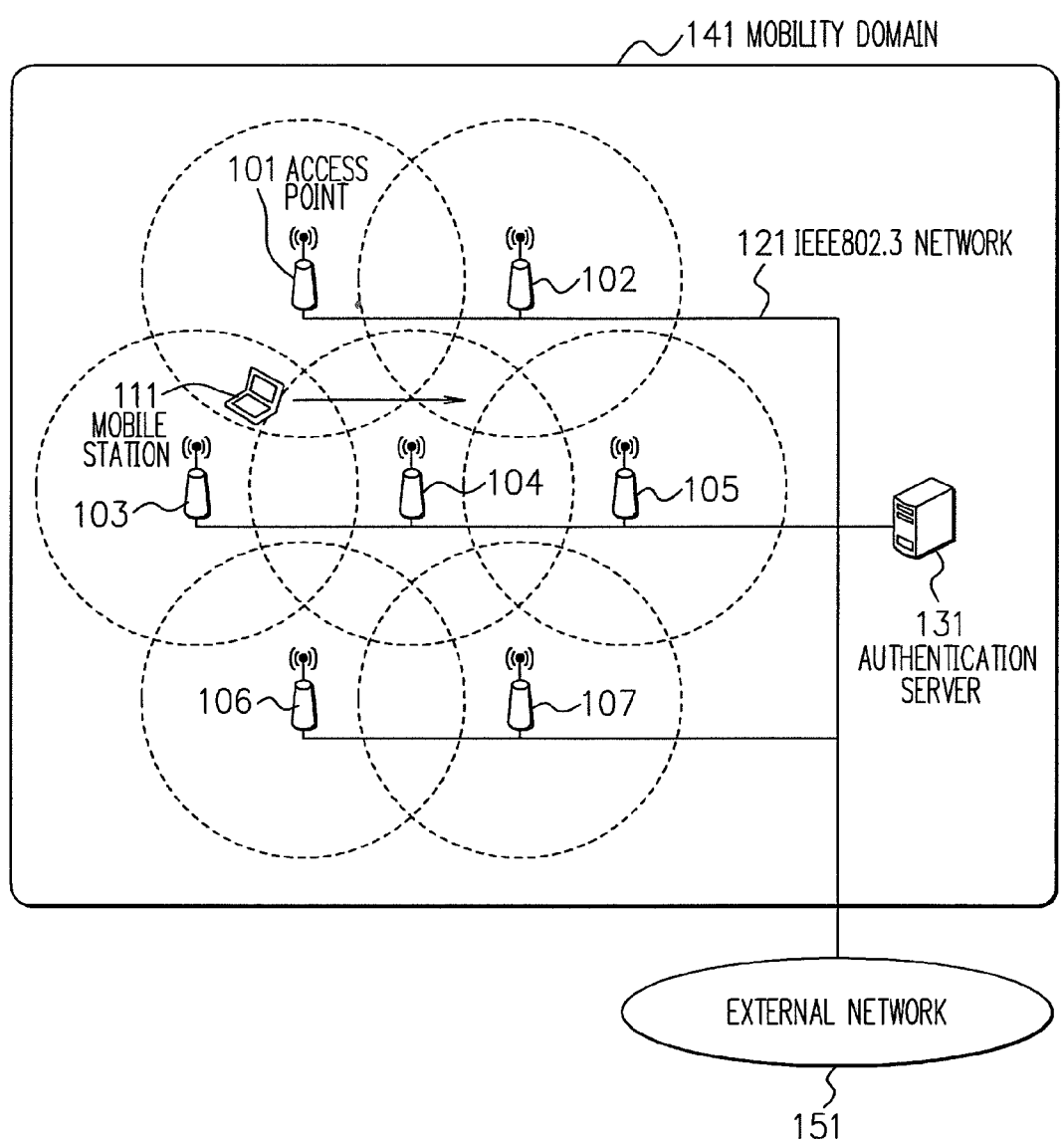
FIG. 1 is a diagram illustrating a configuration of a wireless LAN system.
Figure 2:
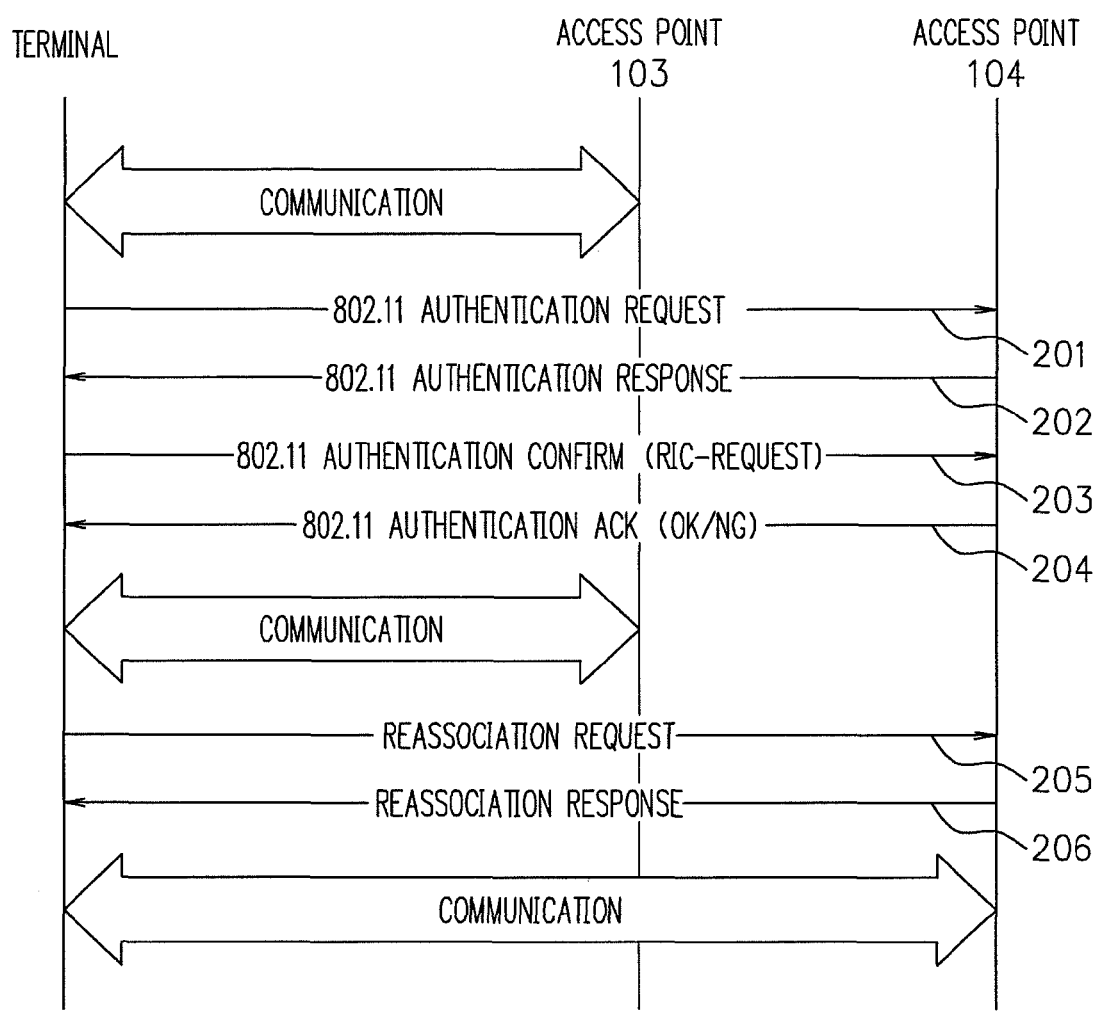
FIG. 2 is a sequence diagram of a handover specified in the IEEE 802.11r standard (Draft 7.0)

FIG. 1 is a diagram illustrating a configuration of a network according to the first exemplary embodiment of the present invention. The network of FIG. 1 includes access points 101 to 107, a mobile station 111, a network 121, an authentication server 131, and an external network 151. The access points 101 to 107 are access points which provide a resource management function. Hereinafter, an access point is exemplarily described which conforms to the IEEE 802.11e standard and the IEEE 802.11r standard which provides a high speed handover function.

The access points are connected to each other via a network specified, for example, in IEEE 802.3 and is also connected to the external network 151. For simplification of description, hereinafter, it is assumed that these access points belong to the same mobility domain.

Here, a mobility domain is a domain in which a high speed handover which conforms to IEEE 802.11r can be performed between access points belonging thereto. These access points may have a function of exchanging information of an access point which exists neighboring to itself according to a method specified in the IEEE 802.11k standard.

The mobile station 111 is a mobile station which has a wireless communication function and a function for reserving a communication resource to an access point in advance before a handover. Hereinafter, a mobile station is exemplarily described which has a wireless LAN function which conforms to the IEEE 802.11e standard and the IEEE 802.11r standard.

The authentication server 131 is a server for authenticating the mobile station 111 as a mobile station authorized to access a network of a mobility domain, for example, using a RADIUS protocol, when the mobile station 111 accesses the access points 101 to 107.

The external network 151 is a network which does not belong to the mobility domain 141.

Figure 3:
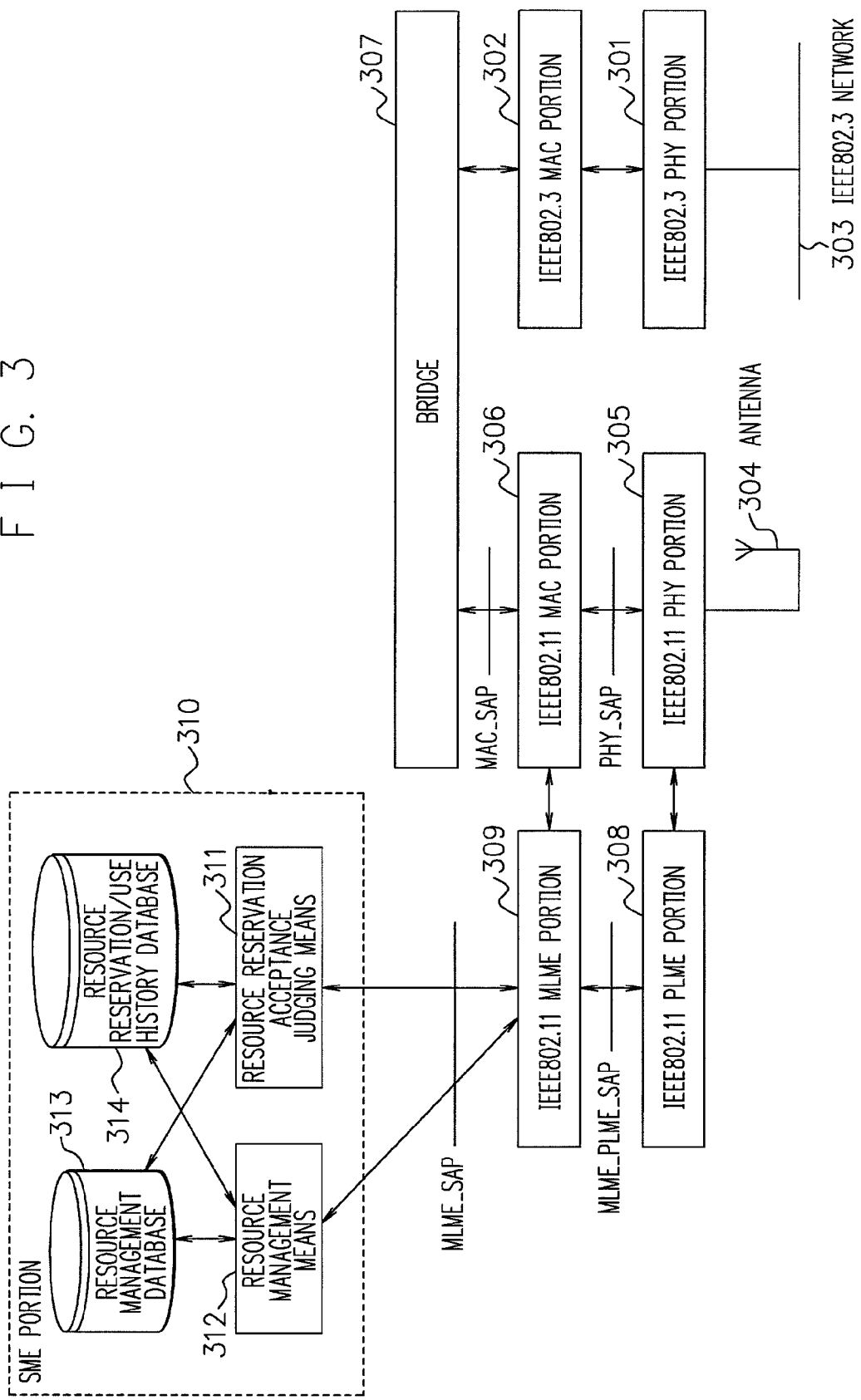
FIG. 3 is a block diagram illustrating a structure of the access points 101 to 107 according to a first exemplary embodiment of the present invention.

FIG. 3 is a block diagram illustrating a structure of the access points 101 to 107 according to the first exemplary embodiment of the present invention. Referring to FIG. 3, as an exemplary configuration of the access point, the access points 101 to 107 include an IEEE 802.3 PHY portion 301, an IEEE 802.3 MAC portion 302, an IEEE 802.3 network 303, an antenna 304, an IEEE 802.11 PHY portion 305, an IEEE 802.11 MAC portion 306, a bridge 307, an IEEE 802.11 PLME portion 308, an IEEE 802.11 MLME portion 309, and an SME portion 310.

The IEEE 802.3 PHY portion 301 is means for processing a PHY function specified in the IEEE 802.3 standard.

The IEEE 802.3 MAC portion 302 is means for processing a MAC function specified in the IEEE 802.3.

The IEEE 802.3 network 303 is a network specified in the IEEE 802.3 standard.

The antenna 304 is means for transmitting a radio signal modulated in the IEEE 802.11 PHY portion 305 or receiving a radio signal transmitted from other mobile stations 111.

The IEEE 802.11 PHY portion 305 is specified in, for example, IEEE 802.11g and has a function for modulating a frame sent from the IEEE 802.11 MAC portion 306 into a radio wave signal and transmitting it through the antenna 304, and a function for demodulating a radio wave signal received from the antenna 304 and transmitting it to the IEEE 802.11 MAC portion 306 as a receiving frame.

The IEEE 802.11 MAC portion 306 processes a function specified as the IEEE 802.11e specification and a function specified as IEEE 802.11r specification.

The bridge 307 investigates a destination address of a receiving frame transmitted from the IEEE 802.3 MAC portion 302, and transmits the frame to the IEEE 802.11 MAC portion 306 if a node indicated by the destination address is a mobile station which resides within a coverage area of the present access point. On the contrary, if a destination of a receiving frame received from the IEEE 802.11 MAC portion 306 is a node within the IEEE 802.3 network 303, the frame is transmitted to the IEEE 802.3 MAC portion 302.

The IEEE 802.11 PLME portion 308 is an entity for controlling the IEEE 802.11 PHY portion 305 and can process MLME_PLME_SAP and PLME_SAP specified in IEEE 802.11g, IEEE 802.11e, and IEEE 802.11r.

The IEEE 802.11 MIME portion 309 is an entity for controlling the IEEE 802.11 MAC portion 306 according to an instruction of the SME portion 310.

Also, in addition to a function for processing MLME_SAP specified in IEEE 802.11g, IEEE 802.11e and IEEE 802.11r, when an Authentication Confirm frame containing a request resource capacity is received, the IEEE 802.11 MLME portion 309 used in the first exemplary embodiment of the present invention has a function for notifying the number together with other parameters to the SME portion 310.

The SME portion 310 is an entity for managing the IEEE 802.11 PHY portion 305 and the IEEE 802.11 MAC portion 306 through the IEEE 802.11 PLME portion 308 and the IEEE 802.11 MLME portion 309. The SME portion 310 includes a resource reservation acceptance judging means 311, a resource management means 312, a resource management database 313, and a resource reservation/use history database 314.

When an Authentication Confirm frame is received from the mobile station 111, the resource reservation acceptance judging means 311 receives the information from the IEEE 802.11 MLME portion 309. A current resource use state and a resource reservation state which are recorded in the resource management database 313, a request resource capacity notified from the IEEE 802.11 MLME portion 309, and a resource use probability are obtained, wherein a resource use probability is computed by dividing the number of times that a mobile station has used a resource before a reservation deadline by the number of times that a mobile station has performed a resource reservation.

It is determined whether to accept a resource request or not based on the resource use probability. If a resource request is accepted, resource securing success is notified to the IEEE 802.11 MLME portion 309. At the same time, an MAC address of a mobile station which is a request source, a request resource capacity indicated by a mean data rate contained in the 802.11 AUTHENTICATION CONFIRM frame 203, and a deadline of a resource reservation are set in the resource management database 313. Also, a resource use state is set to "reserved".

A request resource to be set is not limited to a mean data rate but may include a minimum data rate or a maximum data rate. On the contrary, if a resource request is not accepted, resource securing failure is issued to the IEEE 802.11 MLME portion 309.

If a use of a resource is notified from the IEEE 802.11 MLME portion 309, the resource management means 312 investigates an address of a transmitting source contained in a parameter of the primitive and investigates whether there is a resource reserved by the mobile station or not through the resource management database 313. If there exists a resource reserved by the mobile station which is a transmitting source and a reservation deadline does not lapse, a resource sate is changed to "in use".

The resource management database 313 stores a resource management table, for example, shown in FIG. 4. An address of a requester, a request resource capacity, a resource use state, and a resource reservation deadline are recorded in the table. As a requester address, recorded is an address of a mobile station which is a communication apparatus for performing a resource reservation. As a resource use state, recorded is information indicating whether a mobile station of the user address is using or has reserved a resource or not. A resource reservation deadline is recorded for a resource whose use state is set to "reserved".

In case of a first line of FIG. 4, in a resource requester whose address is STA1, a resource capacity is set to 64 kbps, a resource use state is set to "reserved", a resource reservation deadline is set to Jan. 27, 2007 22:45:00.

The resource reservation/use history database 314 stores a resource reservation/use history table, for example, shown in FIG. 5. In the resource reservation/use history table, recorded are an address of a requester, the resource reservation frequency, and the use frequency. As the resource reservation frequency, recorded is the number of times that a resource reservation has been performed to the access point in the past. As the use frequency, recorded is the number of times that a mobile station reserved a resource and actually used the resource to perform a communication in the past.

A first line of FIG. 5 shows that a resource requester whose address is STA1 reserved a resource 10 times but actually used the resource to perform a communication 9 times.

Processing of when an access point judges acceptance of a resource reservation performed by a mobile station and processing of when a reserved resource is actually used and so information is updated will be described with reference to FIGS. 3 and 6 to 9.

FIG. 6 is a flowchart illustrating an operation of the resource reservation acceptance judging means 311 within the access points 101 to 107. By this operation, an access point judges acceptance of a resource reservation performed by a mobile station. It is investigated whether there is a resource reservation request from the IEEE 802.11 MLME 309 or not (step 101). If there is no request yet, processing returns to step 101, and it is on standby until a request is received. If there is a request, "PeerMACAddress" indicating an address of a mobile station which performs a resource reservation is substituted to a variable "addr" (step 102). Then, resource reservation/use history database probability acquiring processing is performed (step 103) to acquire a resource use probability which is computed by dividing the number of times that a mobile station used a resource before a reservation deadline by the number of times that a mobile station has performed a resource reservation. Resource reservation/use history database probability acquiring processing will be described later in detail.

The resource use probability is compared to a predetermined reservation acceptance threshold (step 104), and if the resource use probability is greater than the predetermined reservation acceptance threshold, it is notified that the resource is secured (step 105), whereas if the resource use probability is smaller than the predetermined reservation acceptance threshold, it is notified that the resource is not secured (step 106). After step S106, processing returns to step 101 to be on standby until there is a reservation request. Meanwhile, after step 105, information indicating that a reservation has been accepted is added to the resource management table (step 107). In this instance, a resource use state is set to "reserved". Resource reservation/use history table updating processing (step 108) is performed, and then processing returns to step 101 to be on standby until there is a resource request. Resource reservation/use history table updating processing will be described later in detail.

Figure 7:
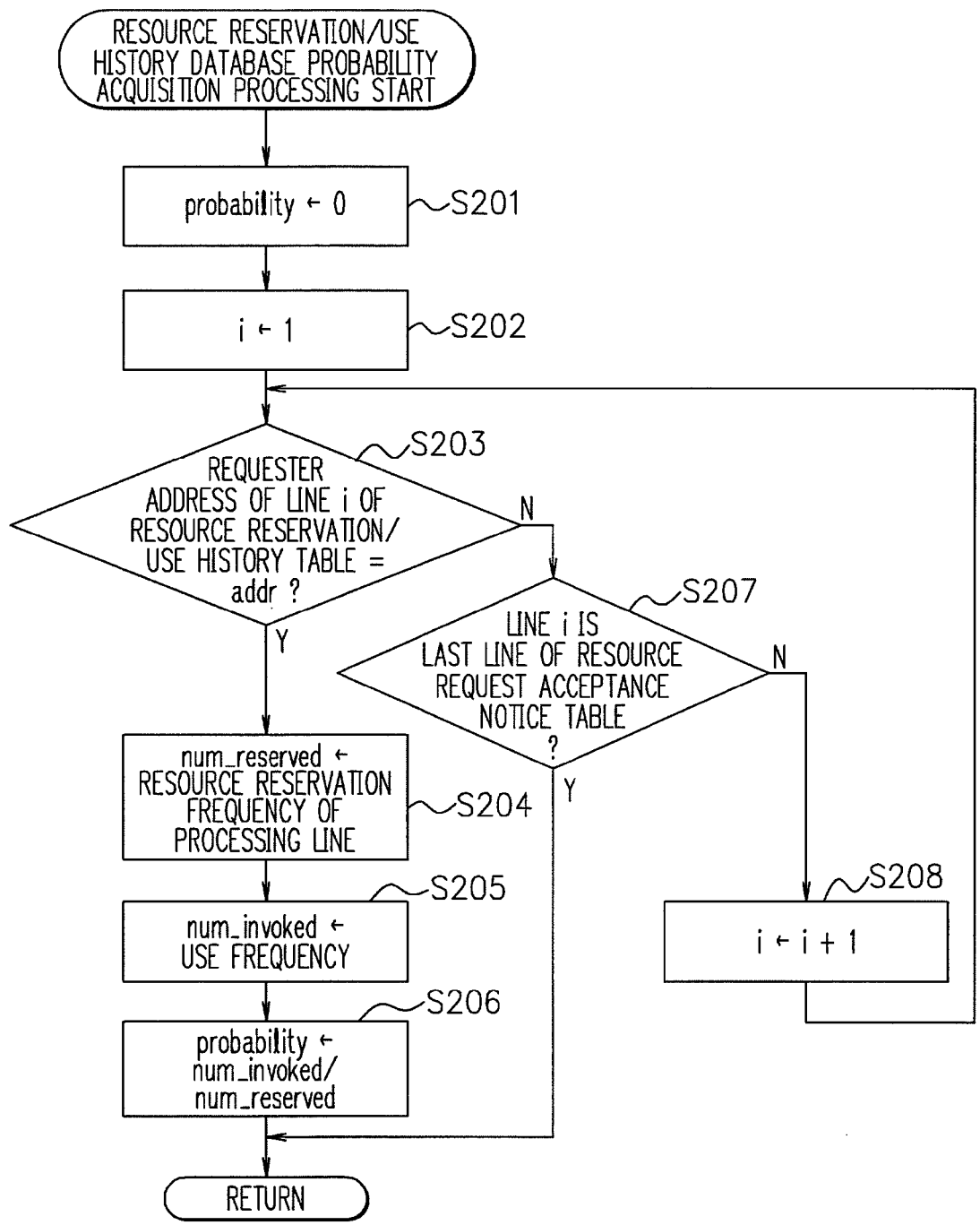
FIG. 7 is a flowchart illustrating an operation of resource reservation/use history database probability acquisition processing in the resource reservation acceptance judging means 311 according to the first exemplary embodiment of the present invention.

FIG. 7 is a flowchart illustrating an operation of resource reservation/use history database probability acquisition processing.

First, initialization is performed by substituting zero (0) to a variable "probability" storing a resource use probability (step 201). One (1) is set to a variable "i" storing a processing line of the resource reservation/use history table (step 202). It is investigated whether a requester address of a line i of the resource reservation/use history table is identical to a variable "addr" or not (step 203). If identical, the resource reservation frequency of the line i of the resource reservation/use history table is substituted to a variable "num_reserved" storing a total sum of the number of times that a reservation is made (step 204). The use frequency of a processing line is substituted to a variable "num_invoked" storing a total sum of the number of times that a reservation is actually performed (step 205). A value obtained by dividing a value of a variable "num_invoked" by a value of a variable "num_reserved" is stored in a variable "probability" storing a resource use probability (step 206). After a probability computation is completed, processing returns to the first step.

Meanwhile, in step 203 described above, if a requester address of the line i of the resource reservation/use history table is not identical to a variable "addr", it is investigated whether the line i is the last line of the resource reservation/use history table or not (step 207). If it is the last line, processing returns to the first step, whereas if it is not the last line, one (1) is added to a variable "i" (step 208), and processing proceeds to step 203.

Figure 8:
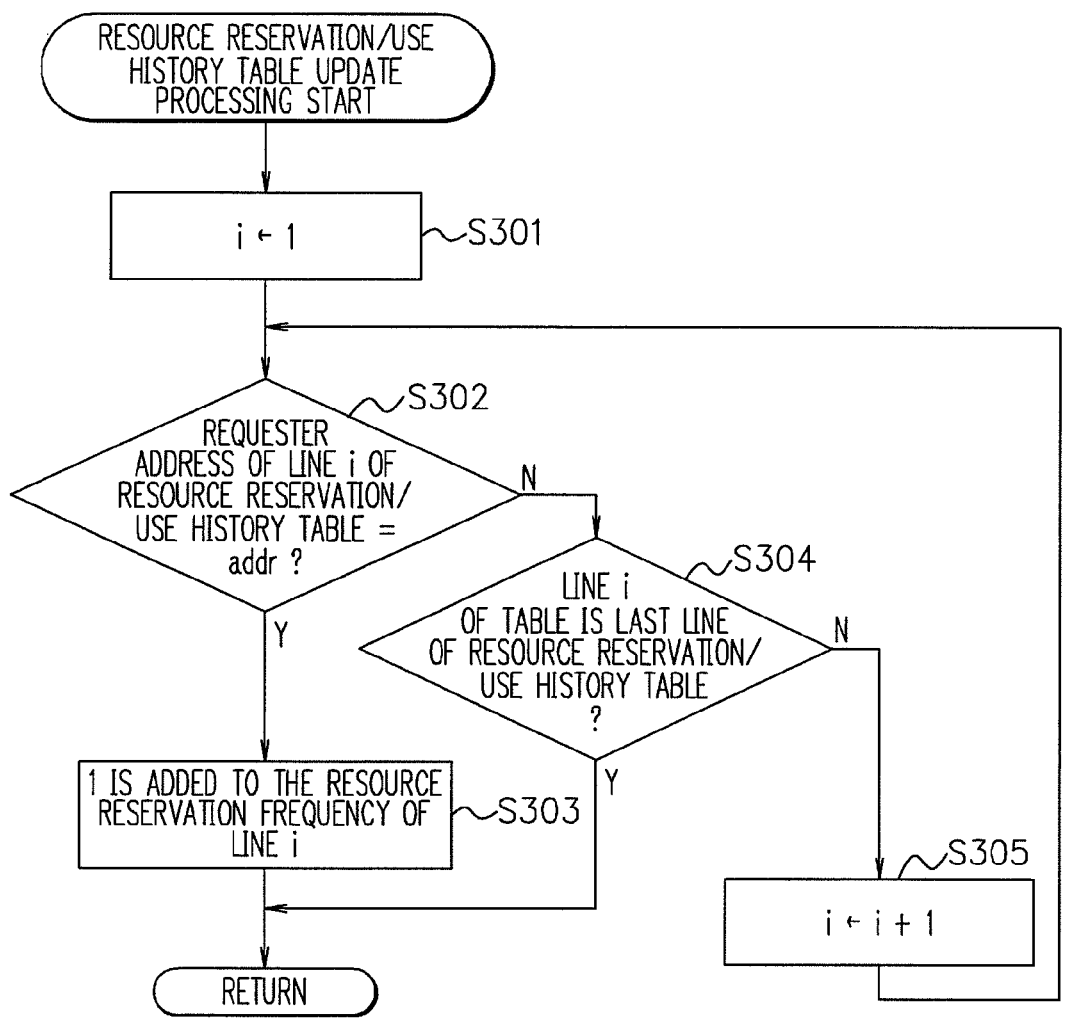
FIG. 8 is a flowchart illustrating an operation of resource reservation/use history table update processing in the resource reservation acceptance judging means 311 according to the first exemplary embodiment of the present invention.

FIG. 8 is a flowchart illustrating an operation of resource reservation/use history table updating processing. By this processing, contents of the resource reservation frequency in the resource reservation/use history table are updated.

First, "1" which indicates a first line is set to a variable "i" representing a table line processed in the resource reservation/use history table (step 301). It is investigated whether a requester address of a line i of the resource reservation/use history table is identical to a value of a variable "addr" (step 302). If identical, one (1) is added to the resource reservation frequency of the line i of the resource reservation/use history table (step 303), and then processing proceeds to the step that calls this processing.

Meanwhile, if the requester address of the line i of the resource reservation/use history table is not identical to a variable "addr", it is investigated whether the line i is the last line of the resource reservation/use history table or not (step 304). If it is the last line, processing returns to the step that calls this processing, whereas if it is not the last line, one (1) is added to the variable "i" (step 305), and processing proceeds to step 302.

As described above, the access point judges whether to accept a resource reservation performed by the mobile station or not based on the resource use probability. The resource use probability is obtained by dividing the number of times that a mobile station uses a resource before a reservation deadline by the number of times that a mobile station performs a resource reservation, and it is specified in the IEEE 802.11r standard that a reservation content can be overwritten. In this instance, the overwriting frequency may or may not be contained in the number of times that a resource reservation is performed.

Figure 9:
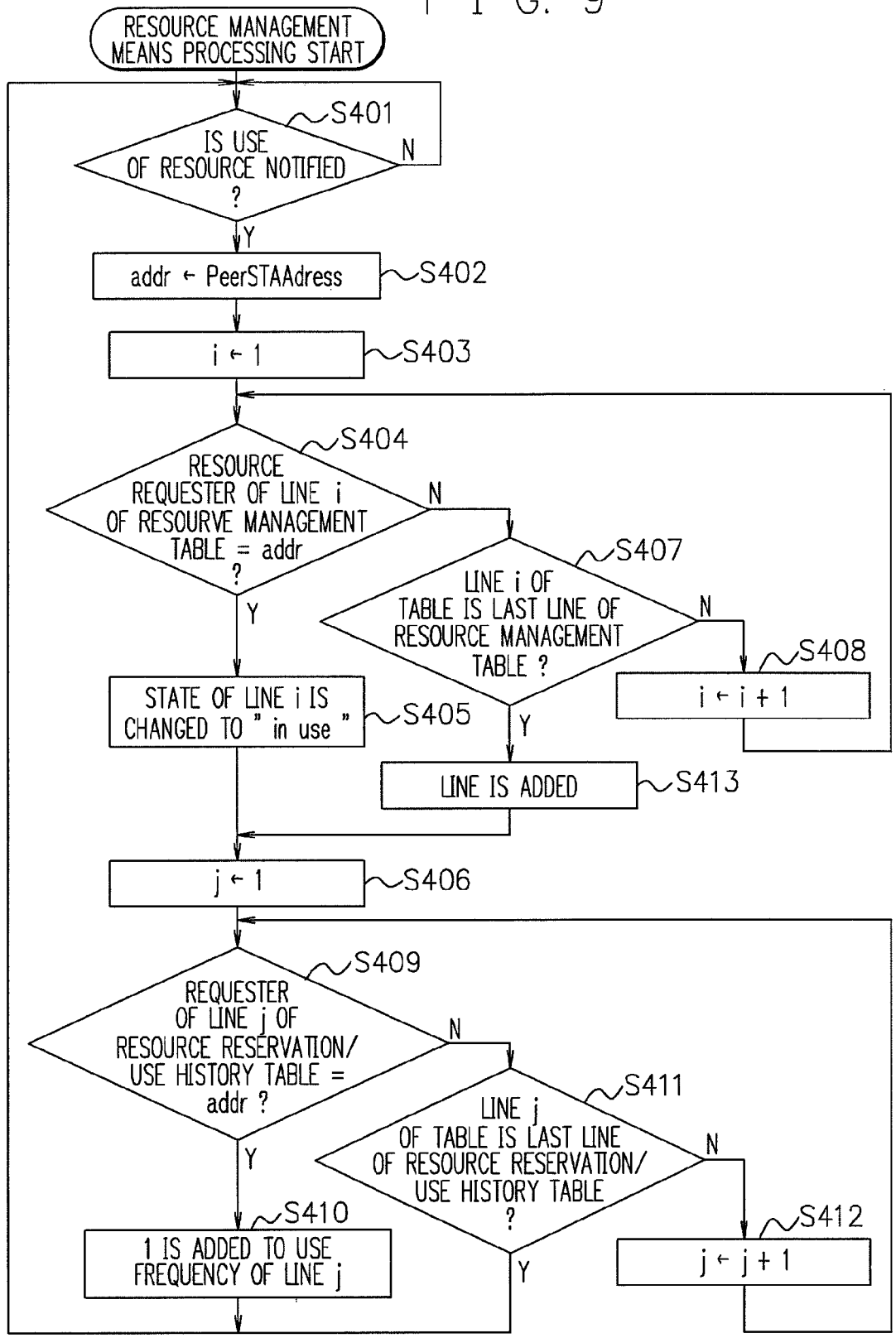
FIG. 9 is a flowchart illustrating an operation of a resource management means 312 according to the first exemplary embodiment of the present invention.

FIG. 9 is a flowchart illustrating an operation of the resource management means 312. By this processing, a content of the use frequency in the resource reservation/use history table is updated when a resource reserved is actually used.

First, it is checked whether a use of a resource is notified from the IEEE 802.11 MLME 309 or not (step 401). If not notified, processing returns to step 401 to be on standby until notified. If notified, "PeerSTAAddress" indicating an address of a mobile station which has performed a resource reservation is substituted to a variable "addr" (step 402). A variable "i" indicating a processed line of the resource management table is initialized to one (1) (step 403). It is investigated whether a requester address of a line i of the resource management table is identical to "addr" or not (step 404). If identical, a state of the line i of the resource management table is changed to "in use" (step 405). In order to update the resource reservation/use history table, a variable "j" is initialized to one (1) (step 406), and processing proceeds to step 409.

However, if the address of the resource requester is determined as different from "addr" in step 404, it is investigated whether the line i is the last line of the resource management table or not (step 407). If it is the last line, a line containing a requester address is added to the resource management table (step 413), and processing proceeds to step 406. If it is not the last line, one (1) is added to a variable "i", and then processing returns to step 404 (step 408).

After step 406, it is investigated whether a requester address of a line j of the resource reservation/use history table is identical to "addr" or not (step 409). If identical, one (1) is added to the use frequency of the line j of the resource reservation/use history table (step 410), and then processing returns to step 401. However, if the requester address of the line j of the resource reservation/use history table is not identical to "addr", it is investigated whether the line j of the table is the last line of the resource reservation/use history table or not (step 411). If it is the last line, processing returns to 401 to be on standby to receive an event. However, if it is not the last line, one (1) is added to the variable "j" (step 412), and processing returns to step 409. In the first exemplary embodiment of the present invention, the use frequency is stored, but the non-use frequency may be stored. In this instance, the use frequency can be obtained by subtracting the non-use frequency from the reservation frequency.

In the first exemplary embodiment of the present invention, a handover in a wireless LAN, particularly between an access point and a mobile station, is described, but the present invention can be applied to a communication between mobile stations which is an Ad-hoc communication in which an access point is not provided. If the resource use probability is computed based on the resource reservation frequency and the use frequency, and processing for judging whether to accept a resource reservation or not based on the resource use probability is performed, the present invention is not limited to a certain communication type but can be applied to both of a wireless communication and a wire line communication.

In the first exemplary embodiment of the present invention, since the probability that the reserved resource is actually used is considered, it is possible to use the resources of the access point effectively.

Second Exemplary Embodiment

In a first exemplary embodiment of the present invention, it is judged whether to accept a reservation or not by comparing the resource use probability to the reservation acceptance threshold in magnitude, but a communication apparatus according to the second exemplary embodiment of the present invention judges whether to accept a reservation or not based on the same probability as the resource use probability.

Hereinafter, a communication apparatus which accepts a reservation is referred to as an access point, and a communication apparatus which performs a reservation is referred to as a mobile station. The second exemplary embodiment of the present invention will be described as an example focusing on a wireless LAN system which includes an access point and a mobile station.

In the second exemplary embodiment of the present invention, a basic configuration is similar to the first exemplary embodiment but is different from the first exemplary embodiment in operation of the resource reservation acceptance judging means 311 of the access points 101 to 107 shown in FIG. 3.

Figure 10:
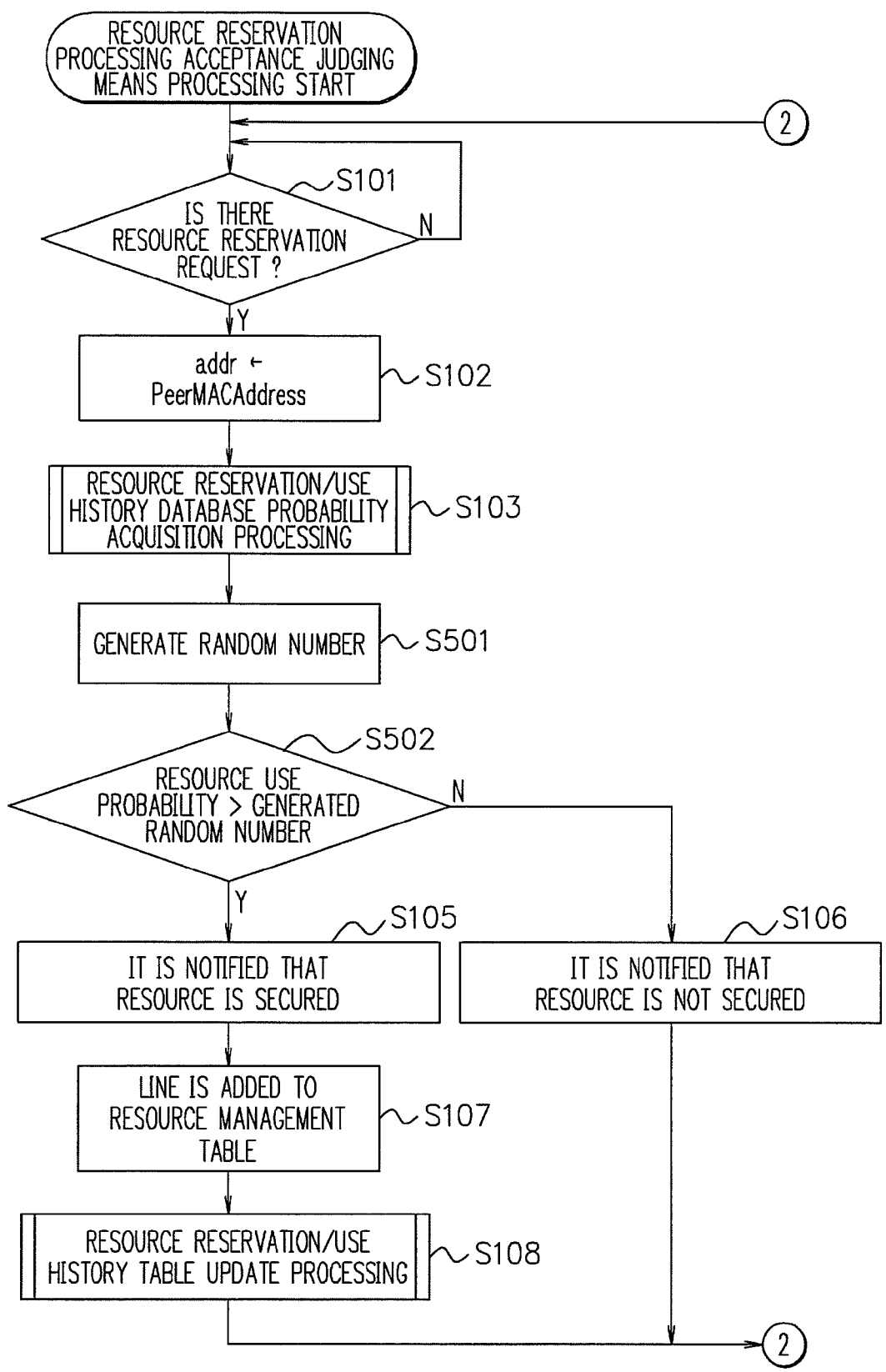
FIG. 10 is a flowchart illustrating an operation of the resource reservation acceptance judging means 311 according to a second exemplary embodiment of the present invention.

FIG. 10 is a flowchart illustrating an operation of the resource reservation acceptance judging means 311 according to the second exemplary embodiment of the present invention.

In the first exemplary embodiment, after resource reservation/use history database probability acquisition processing (step 103) is performed, the resource use probability is compared in magnitude to the reservation acceptance threshold, but in the second exemplary embodiment, after step 103, a random number of 0 to 1 is generated (step 501), and the resource use probability is compared in magnitude to the random number generated in step 501 (step 502). If the resource use probability is greater than the random number, it is notified that a resource is secured (step 105), but if the resource use probability is smaller than the random number, it is notified that a resource is not secured.

In the second exemplary embodiment, the allocation is performed based on the resource use probability itself, but it is not limited to the resource use probability itself. For example, the allocation can be performed based on the probability that has zero (0) as a lower limit and one (1) as an upper limit (resource use probability+L). That is, a form proportional to the resource use probability is possible (L is a number between −1 and 1).

A form of setting a threshold according to the resource use probability stepwise, other than the resource use probability itself, is also possible.

FIG. 11 shows one example of a resource reservation acceptance probability table in which a threshold is set stepwise. The upper use probability and the reservation acceptance probability are recorded in the resource reservation acceptance probability table. The upper use probability represents the probability that is within a range of from a value indicated in a corresponding line to a vale indicated in the next line. For example, "1" recorded in a line 1 means that a probability value corresponds to a range which is greater than 0.8 of a line 2 and is equal to or less than 1. The reservation acceptance probability means a value for performing acceptance of a resource based thereon. For example, if the resource use probability is 0.7, since the upper use probability with a range which is greater than 0.6 and equal to or less than 0.8 corresponds to a line of 0.8, resource reservation acceptance is processed with the probability of 0.9.

In the first exemplary embodiment, it is judged whether to accept a resource reservation or not by comparing the resource use probability and the threshold, but in the second exemplary embodiment, it is judged whether to accept a resource or not based on the same probability as the resource use probability, and so an accurate control is possible. Accordingly, there is an advantage of effectively using the resources of the access point.

Third Exemplary Embodiment

In a third exemplary embodiment of the present invention, a communication apparatus which accepts a reservation judges whether to accept a reservation not only based on the resource use probability but also the requested resource capacity, the resource capacity which is in use, and the resource capacity that a reservation is already performed.

Hereinafter, a communication apparatus which accepts a reservation is referred to as an access point, and a communication apparatus which performs a reservation is referred to as a mobile station. The third exemplary embodiment of the present invention will be described focusing on a wireless LAN system which includes an access point and a mobile station as an example.

In the third exemplary embodiment of the present invention, a basic configuration is similar to the first exemplary embodiment but is different from the first exemplary embodiment in operation of the resource reservation acceptance judging means 311 of the access points 101 to 107 shown in FIG. 3.

Figure 12A:
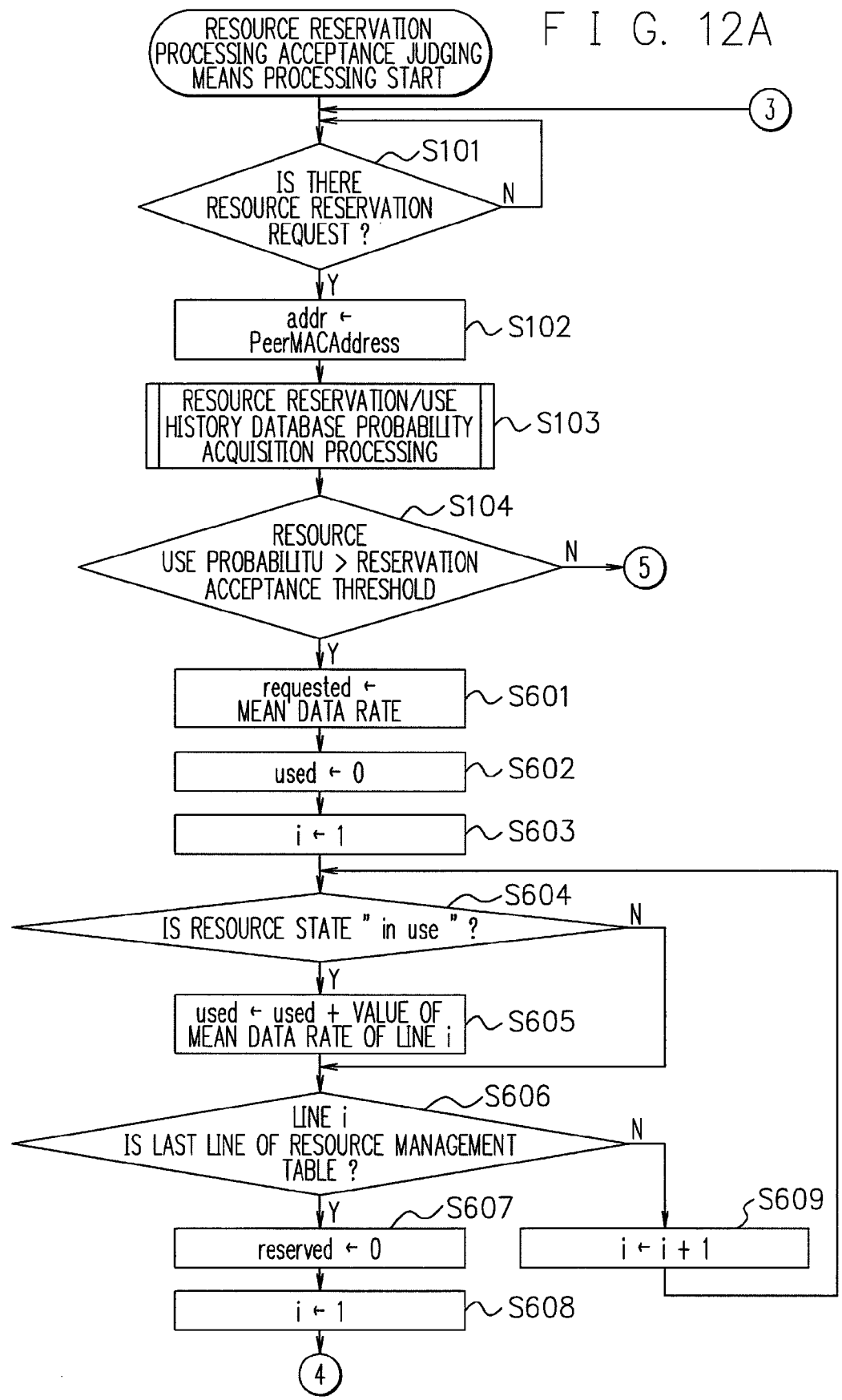
FIG. 12 is a flowchart illustrating an operation of the resource reservation acceptance judging means 311 according to a third exemplary embodiment of the present invention.
Figure 12B:
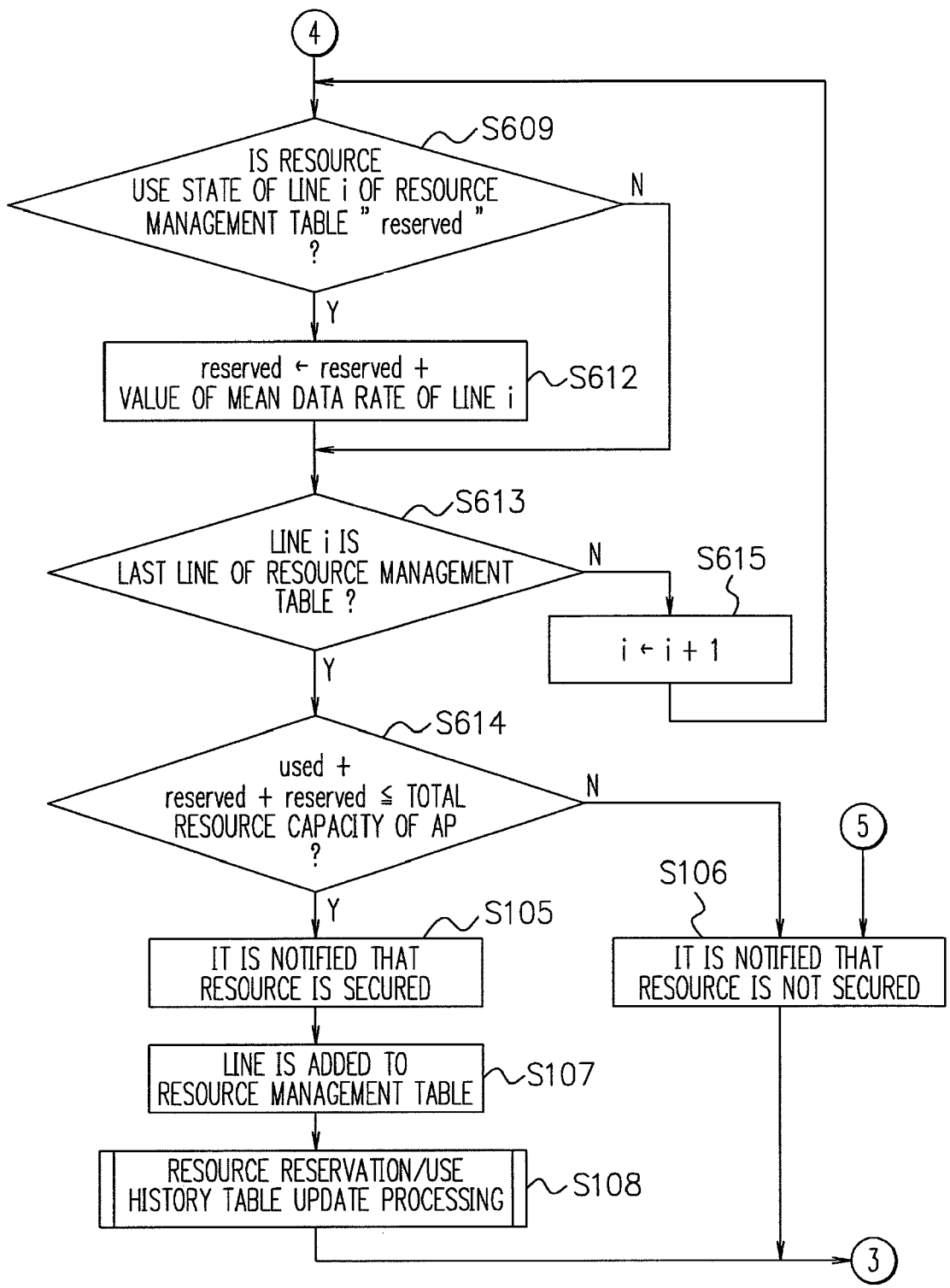

FIG. 12 is a flowchart illustrating an operation of the resource reservation acceptance judging means 311 according to the third exemplary embodiment of the present invention. Compared to FIG. 6, steps 601 to 614 are added which are processing to judge whether to accept a reservation or not by additionally using the requested resource capacity, the resource capacity which is in use, and the resource capacity that a reservation is already performed.

Hereinafter, steps 601 to 614 which are different from FIG. 6 will be described below.

If the resource use probability is determined as greater than the reservation acceptance threshold in step 104, a mean data rate contained in the 802.11 AUTHENTICATION CONFIRM frame 203 is substituted to a variable "request" representing the request resource capacity (step 601). Then, zero (0) is substituted to a variable "used" representing the use resource capacity to perform initialization (step 602). One (1) is substituted to a variable "i" representing a line of the resource management table (step 603). Here, it is investigated whether a resource use state of a line i of the resource management table is "in use" or not (step 604).

If the resource use state of the line i is "in use", a value obtained by adding a mean data rate of the line i to "used" is substituted to "used" (step 605). Then, it is investigated whether the line i is the last line of the resource management table or not (step 606). Also, if it is determined in step 604 that the resource use state of the line i is not "in use", processing proceeds to step 606. If the line i is determined as the last line in step 606, zero (0) is substituted to a variable "reserved" representing the resource capacity that a reservation is already performed to perform initialization (step 607), and one (1) is substituted to "i" (step 608). If it is determined in step 606 that the line i is not the last line, one (1) is added to "i", and processing proceeds to step 604 (step 609).

After step 608, it is investigated whether a resource use state of the line i of the resource management table is "reserved" or not (step 610). If it is "reserved", a value of a mean data rate of the line i is added to "reserved" (step 612), and it is investigated whether the line i is the last line of the resource management table or not (step 613). If it is determined in step 610 that the resource use state is not "reserved", processing proceeds to step 613.

If the line i is determined as the last line in step 613, a resource capacity obtained by adding all of "used", "reserved" and "requested" is compared to the total resource capacity which the access point has (step 614). If both are equal to each other or the total resource capacity which the access point has is greater, processing proceeds to step 105. However, if the total resource capacity which the access point has is smaller, one (1) is added to "i" (step 615), and processing returns to step 610.

In processing of FIG. 12, a resource capacity like "used" is computed from a line 1 of the resource management table whenever there is a reservation request, but it is possible to process that the access point always grasps a use resource and then computes it again when necessary, for example, when a use state is changed.

FIG. 13 is a flowchart illustrating one example of use resource computation processing. When use resource computation processing is performed for the first time, zero (0) is substituted to "used" to perform initialization (step 701). Then, one (1) is substituted to a variable "i" representing a line number of the resource management table to perform initialization (step 702), and it is investigated whether there is a mobile station which starts a communication (step 703). If there is a mobile station which starts a communication, an address of a mobile station which starts a communication is substituted to a variable "addr" (step 704), whereas if there is no mobile station which starts a communication, it is investigated whether there is a mobile station which finishes a communication or not (step 705). If there is a mobile station which finishes a communication, an address of a mobile station which finishes a communication is substituted to a variable "addr" (step 706), whereas if there is no mobile station which finishes a communication, processing returns to step 703.

After step 704, it is investigated whether a resource requester of the line i of the resource management table is identical to "addr" or not (step 707). If identical, a means data rate of the line i of the resource management table is added to "used" (step 708), whereas if not identical, it is investigated whether the line i is the last line of the resource management table or not (step 709). If it is the last line, processing returns to step 702, whereas if it is not the last line, one (1) is added to "i" (step 710), and then processing returns to step 707. Even after step 708, processing returns to step 702.

After processing of step 706 described above, it is investigated whether a resource requester of the line i of the resource management table is identical to "addr" or not (step 711). If identical, a means data rate of the line i of the resource management table is subtracted from "used" (step 712), whereas if not identical, it is investigated whether the line i is the last line of the resource management table or not (step 713). If it is the last line, processing returns to step 702, whereas if it is not the last line, one (1) is added to "i" (step 714), and then processing returns to step 711. Even after step 712, processing returns to step 702.

Using a value obtained by this computation processing as "used" can be replaced with processing of steps 602 to 606 and step 609 of FIG. 12.

This computation has been described focusing on "used", but it can be applied to "reserved", and in this instance, it is replaced with processing of steps 607 to 613 and step 615.

The third exemplary embodiment has been described centering on that a total sum of resource capacities "used", "reserved" and "requested" is strictly compared to the total resource capacity which the access point has, but a form with a predetermined margin is also possible. For example, acceptance may not be performed if a total sum of resource capacities "used", "reserved" and "requested" exceeds an M % of the total resource capacity which the access point has (M is an integer). Also, not all of resource capacities "used", "reserved" and "requested" need to be summed. For example, a total sum of resource capacities "used" and "requested" may be used.

The third exemplary embodiment of the present invention has been described based on the first exemplary embodiment, but processing for using the requested resource capacity, the resource capacity which is in use, and the resource capacity in which a reservation is already performed may be added to the second exemplary embodiment.

In the third exemplary embodiment of the present invention, since whether to accept a resource or not is judged also based on an available resource of the access point, there is an advantage of preventing a communication from being disconnected due to a shortage of a resource when a mobile station performs a handover.

Fourth Exemplary Embodiment

In a fourth exemplary embodiment of the present invention, a communication apparatus which accepts a reservation uses the resource use probability in obtaining an expected value of the requested resource capacity and judges whether to accept a reservation or not based on the expected value of the requested resource capacity, the resource capacity which is in use, and the resource capacity in which a reservation is already performed.

Hereinafter, a communication apparatus which accepts a reservation is referred to as an access point, and a communication apparatus which performs a reservation is referred to as a mobile station. The fourth exemplary embodiment of the present invention will be described focusing on a wireless LAN system which includes an access point and a mobile station as an example.

In the fourth exemplary embodiment of the present invention, a basic configuration is similar to the third exemplary embodiment but is different from the third exemplary embodiment in operation of the resource reservation acceptance judging means 311 of the access points 101 to 107 shown in FIG. 3.

Figure 14A:
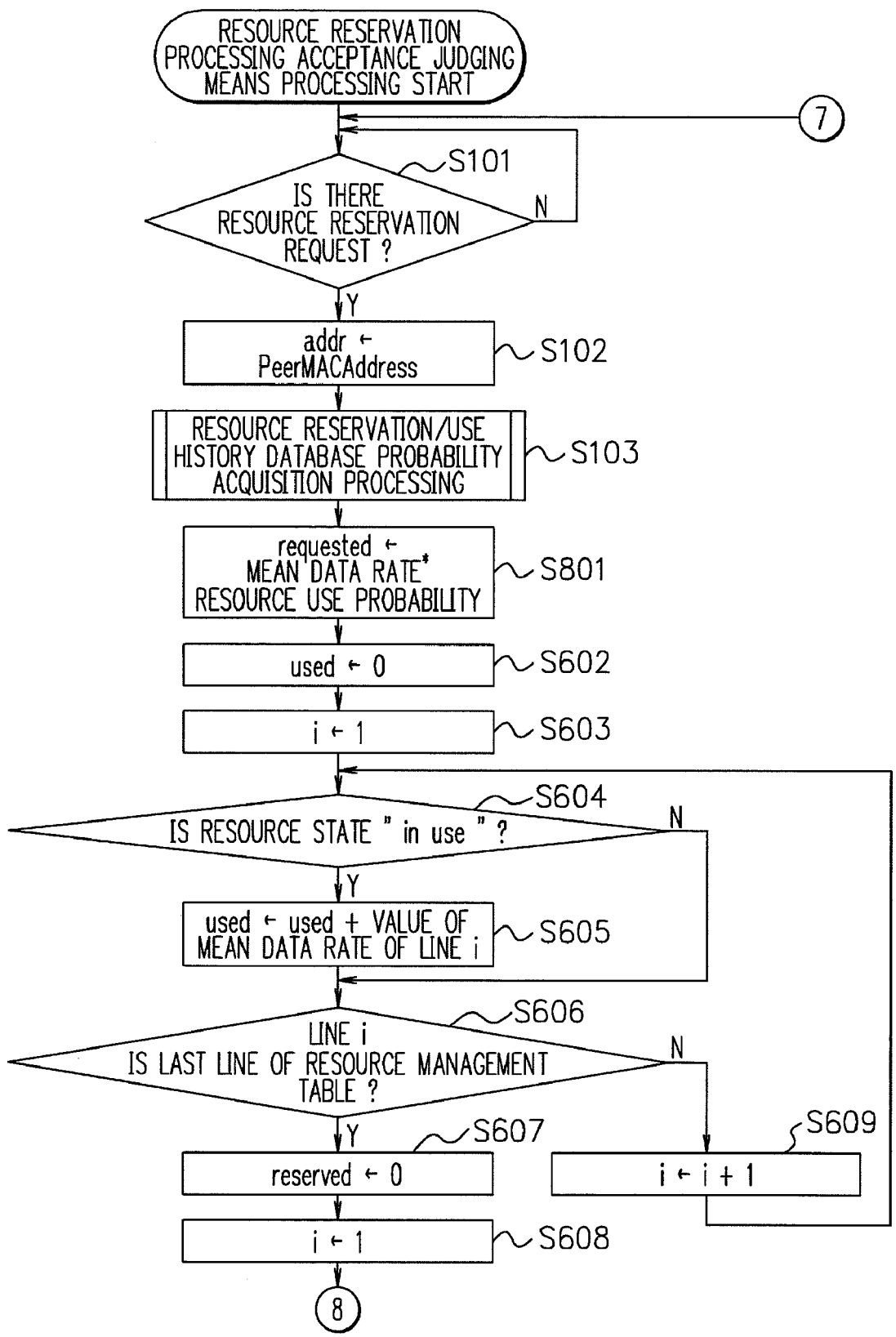
FIG. 14 is a flowchart illustrating an operation of the resource reservation acceptance judging means 311 according to a fourth exemplary embodiment of the present invention.

FIG. 14 is a flowchart illustrating an operation of the resource reservation acceptance judging means 311 according to the fourth exemplary embodiment of the present invention. Compared to FIG. 12, step 104 is deleted, and step 801 for substituting a value obtained by multiplying a mean data rate which is the requested resource capacity by the resource use probability to a variable "requested" is added. The multiplication result represents the expected value of the requested resource capacity.

In processing of FIG. 14, a resource capacity like "used" is computed from a line 1 of the resource management table whenever there is a reservation request, but a form for computing it again when a use state is changed is also possible like FIG. 12.

In the fourth exemplary embodiment of the present invention, whether to accept a reservation or not is judged by computing the expected value of the requested resource capacity. However, it may be implemented such that the expected value of the resource capacity in which a reservation is already performed, as well as the requested resource capacity is computed for each mobile station, and whether to accept a reservation or not is judged based on the result.

Also, the fourth exemplary embodiment has been described centering on that a total sum of resource capacities "used", "reserved" and "requested" is strictly compared to the total resource capacity which the access point has, but a form with a predetermined margin is also possible. For example, acceptance may not be performed if a total sum of resource capacities "used", "reserved" and "requested" exceeds an N % of the total resource capacity which the access point has (N is a positive number).

In the fourth exemplary embodiment of the present invention, unlike the first to third exemplary embodiments, whether to accept a resource reservation or not is judged by expecting the use capacity, whereby there is an advantage of effectively using the resources of the access point.

Fifth Exemplary Embodiment

In a first exemplary embodiment, a communication apparatus which accepts a reservation judges whether to accept a reservation or not based on the resource use probability of each communication apparatus which performs a reservation. However, in the fifth exemplary embodiment of the present invention, a communication apparatus which accepts a reservation judges whether to accept a reservation or not based on the resource use probability computed based on the resource use states of all communication apparatuses which perform a reservation, not based on the resource use state of each mobile station.

Hereinafter, a communication apparatus which accepts a reservation is referred to as an access point, and a communication apparatus which performs a reservation is referred to as a mobile station. The fifth exemplary embodiment of the present invention will be described focusing on a wireless LAN system which includes an access point and a mobile station as an example.

In the fifth exemplary embodiment of the present invention, a basic configuration is similar to the first exemplary embodiment but is different from the first exemplary embodiment in operation of the resource reservation acceptance judging means 311 of the access points 101 to 107 shown in FIG. 3, particularly in operation of resource reservation/use history database probability acquisition processing.

FIG. 15 is a flowchart illustrating an operation of resource reservation/use history database probability acquisition processing according to the fifth exemplary embodiment of the present invention.

Compared to resource reservation/use history database probability acquisition processing according to the first to fourth exemplary embodiments, steps 203 and 207 are deleted, steps 901, 902 and 903 are added.

The added steps are described. After performing initialization by substituting zero (0) to a resource use probability "probability" in step 201, zero (0) is substituted to a variable "num_reserved" representing the resource reservation frequency to perform initialization (step 901), and zero (0) is substituted to a variable "num_invoked" representing the use frequency to perform initialization (step 902). After the use frequency of a line i of a resource request acceptance notice table is added to "num_invoked" in step 205, it is investigated whether the line i is the last line of the resource request acceptance notice table or not (step 903). If it is the last line, a result obtained by dividing "num_invoked" by "num_reserved" is substituted to a resource use probability "probability" as step 206, and if it is not the last line, one (1) is added to "i" in step 208.

In the fifth exemplary embodiment of the present invention, processing of acquiring a sum of the resource reservation frequency and the use frequency of each mobile station is performed, but it may be implemented such that a line having a total sum of all mobile stations computed is stored in advance, and the resource use probability is computed based on the value. Also, it has been described based on the first exemplary embodiment but can be applied to the second to fourth exemplary embodiments.

If the resource use probability of each mobile station is computed like the first to fourth exemplary embodiments, reliability may be lowered. In this instance, like the fifth exemplary embodiment of the present invention, by considering all mobile stations other than each mobile station, a parameter is increased, and reliability is statistically increased. Accordingly, there is an advantage that the access point can effectively use the resources based on higher reliability.

Sixth Exemplary Embodiment

A communication apparatus which accepts a reservation judges whether to accept a reservation or not based on the resource use probability of each communication apparatus which accepts a reservation in the first exemplary embodiment and based on the resource use probability of all of communication apparatuses which accept a reservation in the fifth exemplary embodiment. Meanwhile, in a six exemplary embodiment of the present invention, a communication apparatus which accepts a reservation divides communication apparatuses which perform a reservation into a plurality of groups according a communication rate, a kind of an application, or a contract form, and judges whether to accept a reservation or not based on the resource use probability computed based on the resource use states of communication apparatuses, which perform a reservation, belonging to the same group as a communication apparatus which has reserved a resource.

Hereinafter, a communication apparatus which accepts a reservation is referred to as an access point, and a communication apparatus which performs a reservation is referred to as a mobile station. The sixth exemplary embodiment of the present invention will be described focusing on a wireless LAN system which includes an access point and a mobile station as an example. Also, in the sixth exemplary embodiment of the present invention, grouping is performed based on a communication rate.

In the sixth exemplary embodiment of the present invention, a basic configuration is similar to the fifth exemplary embodiment but is different from the fifth exemplary embodiment in operation of the resource reservation acceptance judging means 311 of the access points 101 to 107 shown in FIG. 3, particularly in operation of resource reservation/use history database probability acquisition processing. Also, it is different in a form of the resource reservation/use history table stored in the resource reservation/use history database 314.

Figure 17:
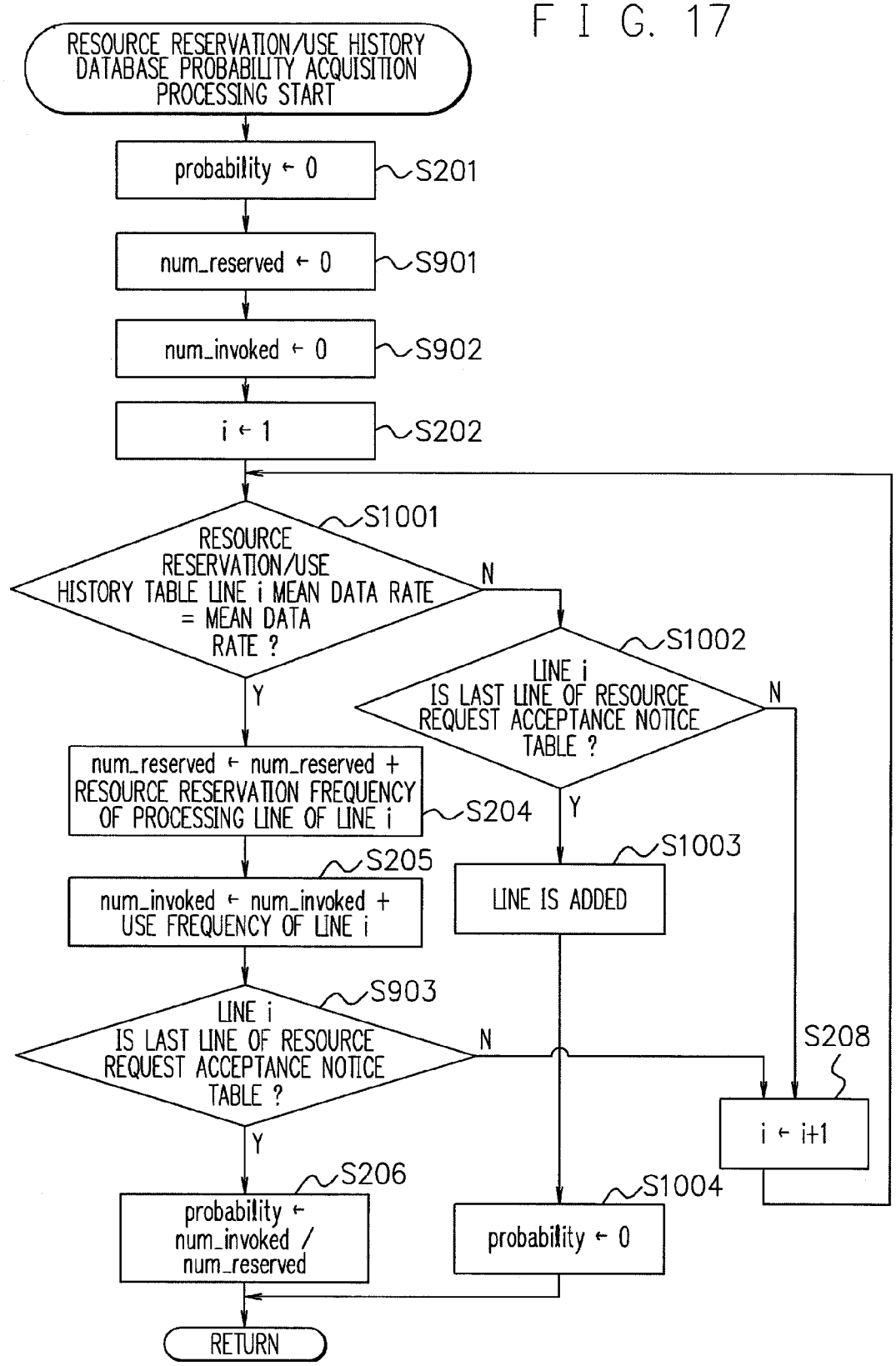
FIG. 17 is a flowchart illustrating operation of resource reservation/use history database probability acquisition processing according to the sixth exemplary embodiment of the present invention.

FIG. 16 shows the resource reservation/use history table according to the sixth exemplary embodiment of the present invention, and FIG. 17 is a flowchart illustrating operation of resource reservation/use history database probability acquisition processing according to the sixth exemplary embodiment of the present invention.

Compared to FIG. 5, FIG. 16 is different in the fact that an item of a mean data rate is added. This item aims to do grouping of mobile stations.

Compared to FIG. 15, FIG. 17 is different in the fact that steps 1001 to 1004 are added. In steps 201, 901, 902, and 202, zero (0) is substituted to variables "probabilitynum_reserved" and "num_invoked", respectively, and one (1) is substituted to "i", thereby performing initialization. Then, it is investigated whether a mean data rate of a line i of the resource reservation/use history table is identical to a mean data rate contained in the 802.11 AUTHENTICATION CONFIRM frame 203 or not (step 1001).

If identical, processing proceeds to step 204 in which the resource reservation frequency of the line i of the resource reservation/use history table is added to a variable "num_reserved", whereas if not identical, it is investigated whether the line i is the last line of the resource request table or not (step 1002). If it is the last line, a line is added to the resource request table to insert a requester address of a mobile station and a mean data rate, one (1) is substituted to the resource reservation frequency, and zero (0) is substituted to the use frequency (step 1003).

In the sixth exemplary embodiment of the present invention, as described in step 1001, if a communication rate is not identical, a different rate is used, but a range of up to ±R kbps may be recognized as identical in communication rate (R is a positive number). Then, zero (0) is substituted to a variable "probability" representing the resource use probability (step 1004), and processing returns to a resource reservation processing acceptance judging means. Meanwhile, if it is determined in step 1002 that it is not the last line, processing proceeds to step 208 in which one (1) is added to "i". Processing after returning to the resource reservation processing acceptance judging means is the same as that of the fifth exemplary embodiment of the present invention.

The sixth exemplary embodiment has been described based on the fifth exemplary embodiment, but it can be applied to the first to fourth exemplary embodiments. Also, in the sixth exemplary embodiment of the present invention, it has been described that the resource use probability is computed for each communication rate, but the resource use probability may be computed for each application or for each contract form.

In the sixth exemplary embodiment of the present invention, if the use state of each group is similar, by computing the resource use probability after grouping mobile stations, parameters of the resource reservation frequency and the use frequency are increased, whereby there is an advantage that reliability of the resource use probability is increased.

Seventh Exemplary Embodiment

In a seventh exemplary embodiment of the present invention, a communication apparatus which accepts a reservation changes an acceptance threshold according to a group of a communication apparatus which performs a reservation.

Hereinafter, a communication apparatus which accepts a reservation is referred to as an access point, and a communication apparatus which performs a reservation is referred to as a mobile station. The seventh exemplary embodiment of the present invention will be described focusing on a wireless LAN system which includes an access point and a mobile station as an example. Also, in the seventh exemplary embodiment of the present invention, grouping is performed based on a communication rate.

In the seventh exemplary embodiment of the present invention, a basic configuration is similar to the first exemplary embodiment but is different from the first exemplary embodiment in configuration of the access points 101 to 107 shown in FIG. 3 and in operation of the resource reservation acceptance judging means 311.

Figure 18:
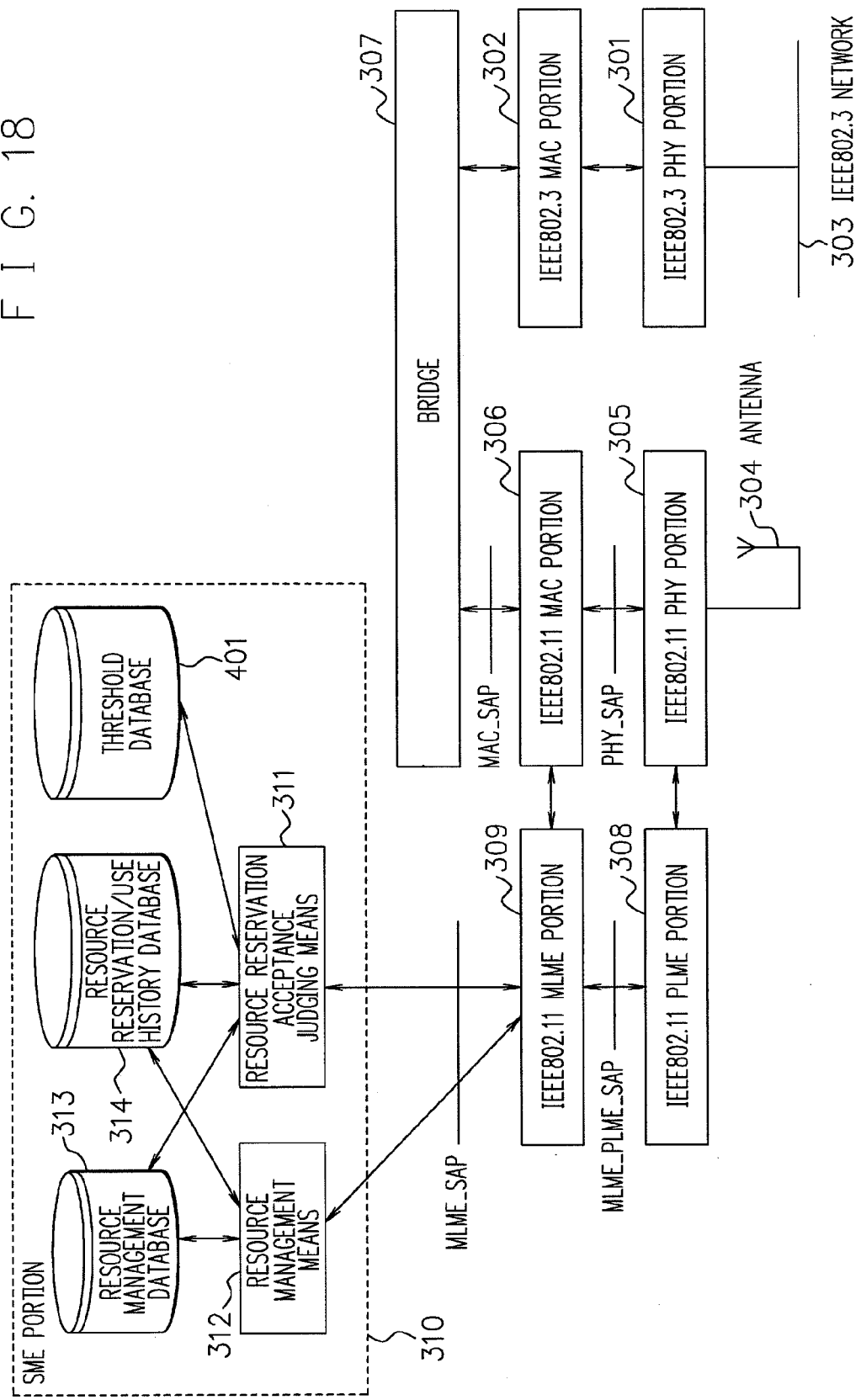
FIG. 18 is a block diagram illustrating a configuration of access points 101 to 107 according to a seventh exemplary embodiment of the present invention.

FIG. 18 is a block diagram illustrating a configuration of the access points 101 to 107 according to the seventh exemplary embodiment of the present invention. Compared to FIG. 3, FIG. 18 is different in the fact that a threshold database 401 is added.

FIG. 19 shows a reservation threshold table contained in the threshold database 401. An acceptance threshold for mobile stations grouped according to a mean data rate is recorded in the reservation threshold table.

Figure 20:
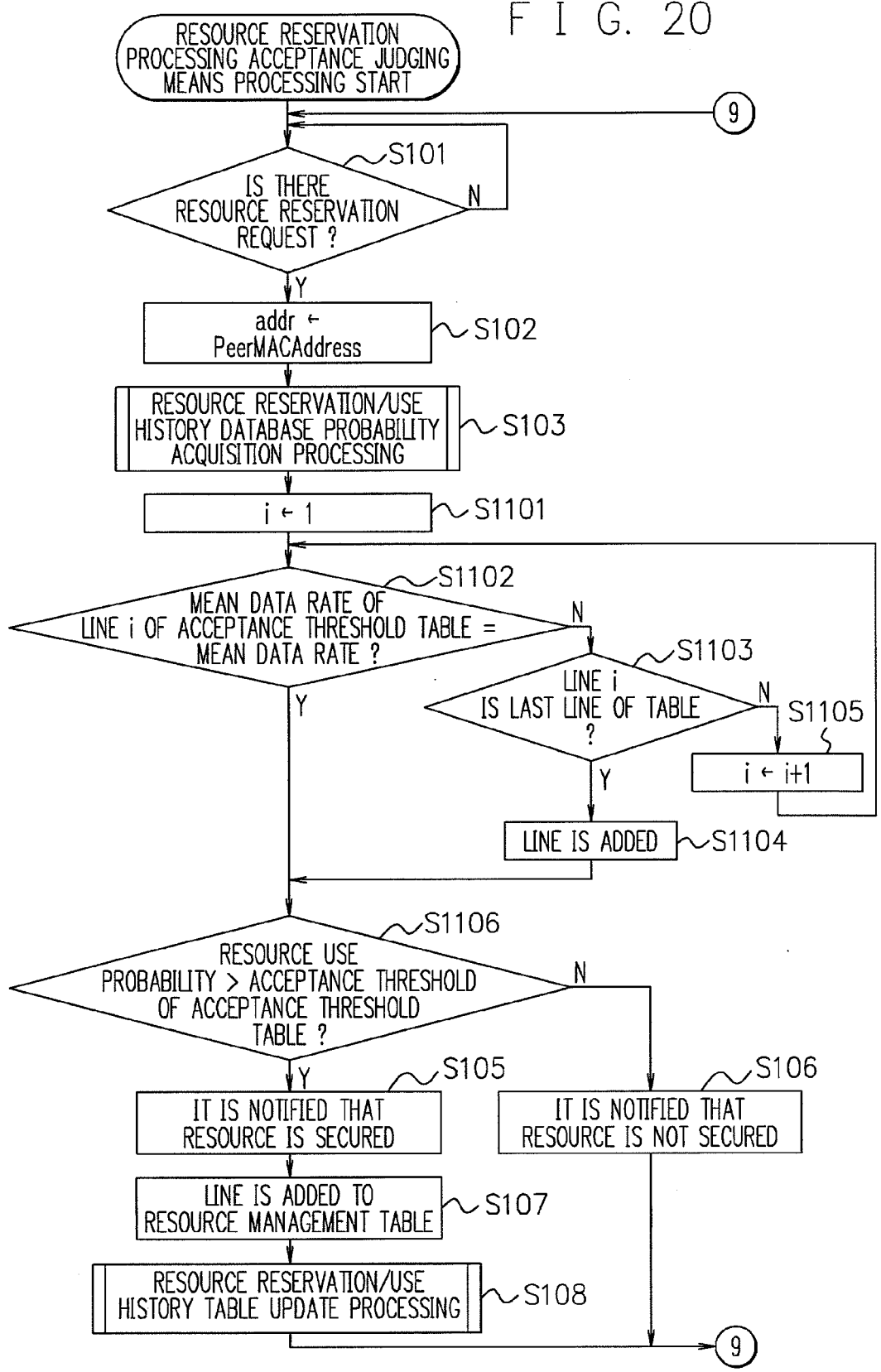
FIG. 20 is a flowchart illustrating an operation of the resource reservation acceptance judging means 311 according to the seventh exemplary embodiment of the present invention.

FIG. 20 is a flowchart illustrating an operation of the resource reservation acceptance judging means 311 according to the seventh exemplary embodiment of the present invention. Compared to FIG. 6, step 104 is deleted, and steps 1101 to 1106 are added. In step 103, the resource use probability is obtained, processing returns to processing of the resource reservation acceptance judging means, and then "i" representing a line number of the acceptance threshold table is initialized to one (10) (step 1101). Then, it is investigated whether a mean data rate of a line i of the acceptance threshold table is identical to a mean data rate contained in 802.11 AUTHENTICATION CONFIRM frame 203 or not (step 1102). If identical, an acceptance threshold contained in a current line of the acceptance threshold table is compared in magnitude to the resource use probability (step 1106). If the resource use probability is greater, processing proceeds to step 105, whereas if the resource use probability is smaller, processing proceeds to step 106.

Meanwhile, if it is determined in step 1102 that it is not identical, it is investigated whether the line i is the last line of the acceptance threshold table or not (step 1103). If it is the last line, a line is added to the acceptance threshold table to insert a mean data rate of a mobile station and an acceptance threshold (step 1104), whereas if it is not the last line, one (1) is added to "i" (step 1105) to return processing to step 1102.

Also, in the seventh exemplary embodiment of the present invention, it has been described that a threshold is changed according to a communication rate, but a threshold may be changed according to a kind of an application. Also, the seventh exemplary embodiment of the present invention has been described based on the first exemplary embodiment, but it can be applied to the second, third, fifth, and sixth exemplary embodiments.

In the seventh exemplary embodiment of the present invention, by changing an acceptance threshold according to a group, for example, a mobile station having a fast communication rate is easily accepted, whereby there is an advantage that a resource can be controlled according to a mobile station.

Eighth Exemplary Embodiment

In a eighth exemplary embodiment, a communication apparatus which accepts a reservation obtains the resource use probability by statistically using a communication rate as a resource capacity and judges whether to accept a reservation or not based on the probability. For example, the resource use probability is computed by dividing a total sum of resource capacities actually used by a communication apparatus which performs a reservation to perform a communication by a total sum of reserved resource capacities.

Hereinafter, a communication apparatus which accepts a reservation is referred to as an access point, and a communication apparatus which performs a reservation is referred to as a mobile station. The eighth exemplary embodiment of the present invention will be described focusing on a wireless LAN system which includes an access point and a mobile station as an example.

In the eighth exemplary embodiment of the present invention, a basic configuration is similar to the first exemplary embodiment but is different from the first exemplary embodiment in configuration of the access points 101 to 107 shown in FIG. 3, in operations of the resource reservation acceptance judging means 311 and the resource management means 312, and in contents of the resource management database 313 and the resource reservation/use history database 314.

Figure 21:
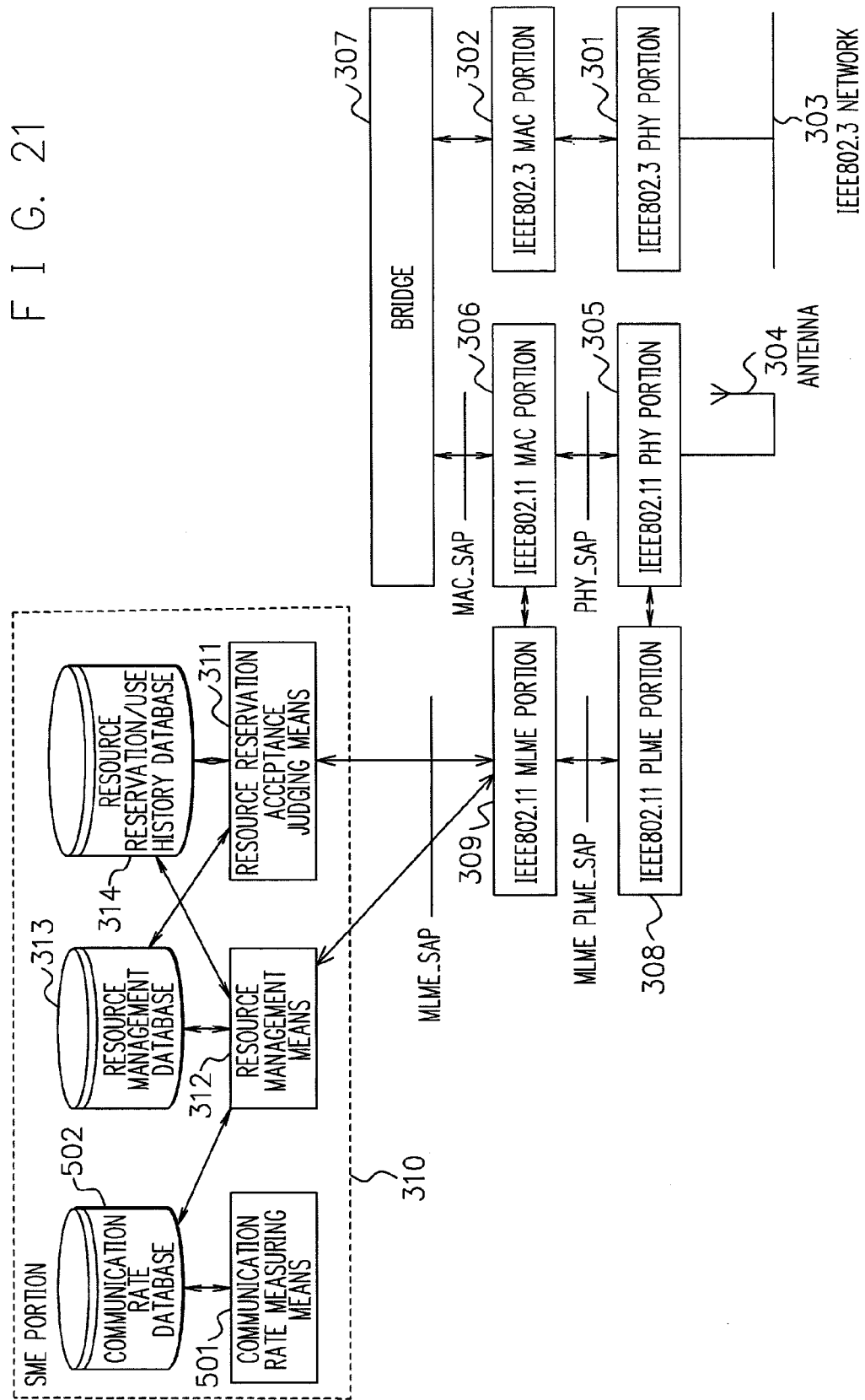
FIG. 21 is a block diagram illustrating a configuration of the access points 101 to 107 according to an eighth exemplary embodiment of the present invention.

FIG. 21 is a block diagram illustrating a configuration of the access points 101 to 107 according to the eighth exemplary embodiment of the present invention. Compared to FIG. 3, a communication rate measuring means 501 and a communication rate database 502 are added to the SME portion 310. The communication rate measuring means 501 measures an actual rate at a corresponding access point for each mobile station and transmits it to the communication rate database 502. This measurement is reset after a communication is finished and is then performed again.

FIG. 22 shows a resource reservation/use history table contained in the resource reservation/use history database 314. In FIG. 5, a requester address, the resource reservation frequency, and the use frequency are recorded, whereas in the eighth exemplary embodiment of the present invention, a requester address, a reserved capacity which is a total sum of reserved resource capacities, and a used capacity which is a total sum of actually used resource capacities are recorded.

FIG. 23 shows a communication rate table contained in the communication rate database 502. In this table, a requester address and an actual communication rate at a corresponding access point measured by the communication rate measuring means 501 are recorded.

Figure 24:
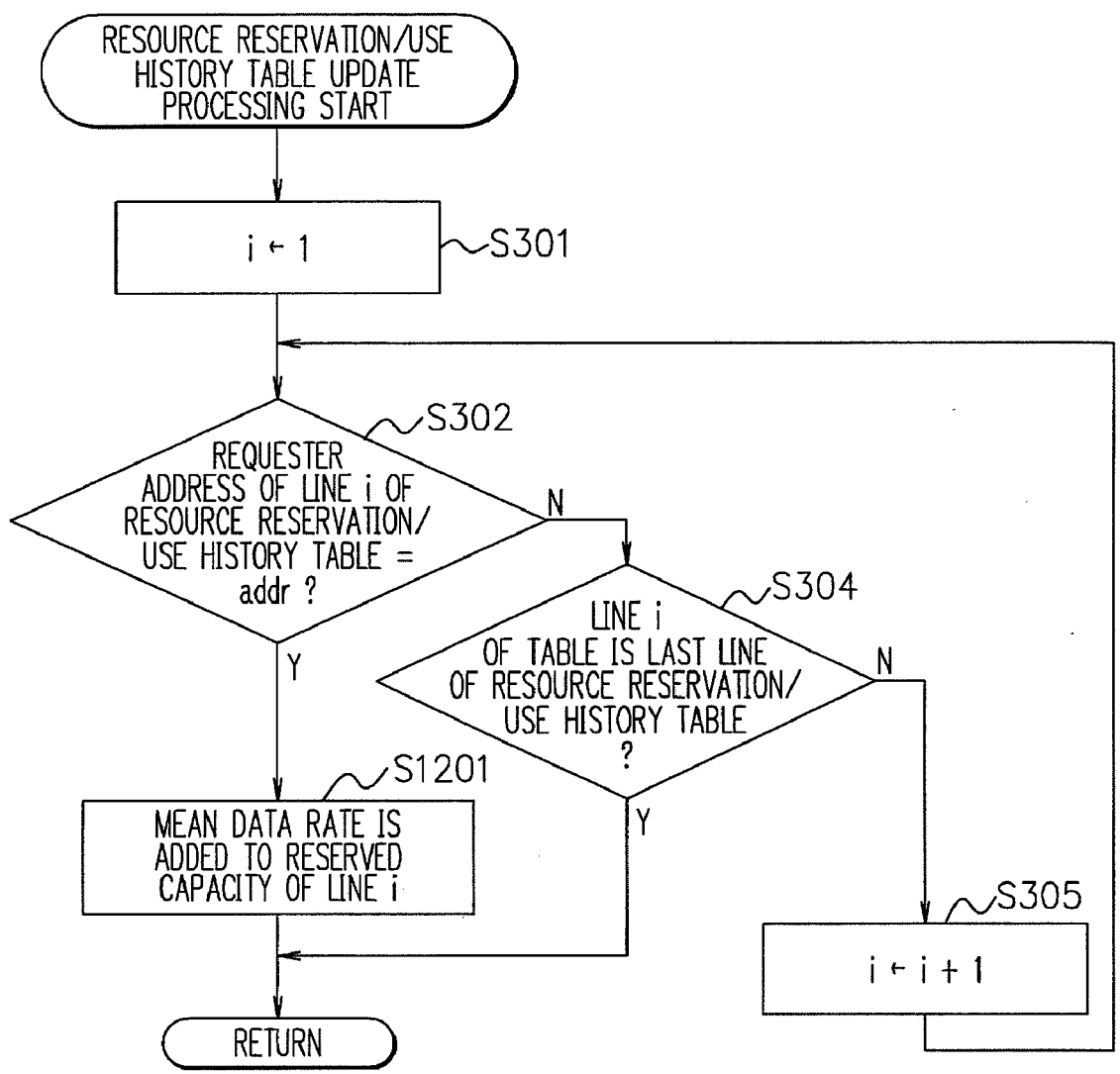
FIG. 24 is a flowchart illustrating an operation of resource reservation/use history table update processing according to the eighth exemplary embodiment of the present invention.

FIG. 24 is a flowchart illustrating an operation of resource reservation/use history table update processing (step 108). Compared to FIG. 8, step 303 and step 1201 are changed. In step 302, if a requester address of a line i of the resource reservation/use history table is identical to "addr", a mean data rate contained in the 802.11 AUTHENTICATION CONFIRM frame 203 is added to a value recorded in an item of a reserved capacity of a line i of the resource reservation/use history table and returns to a resource reservation processing acceptance judging means.

Figure 25:
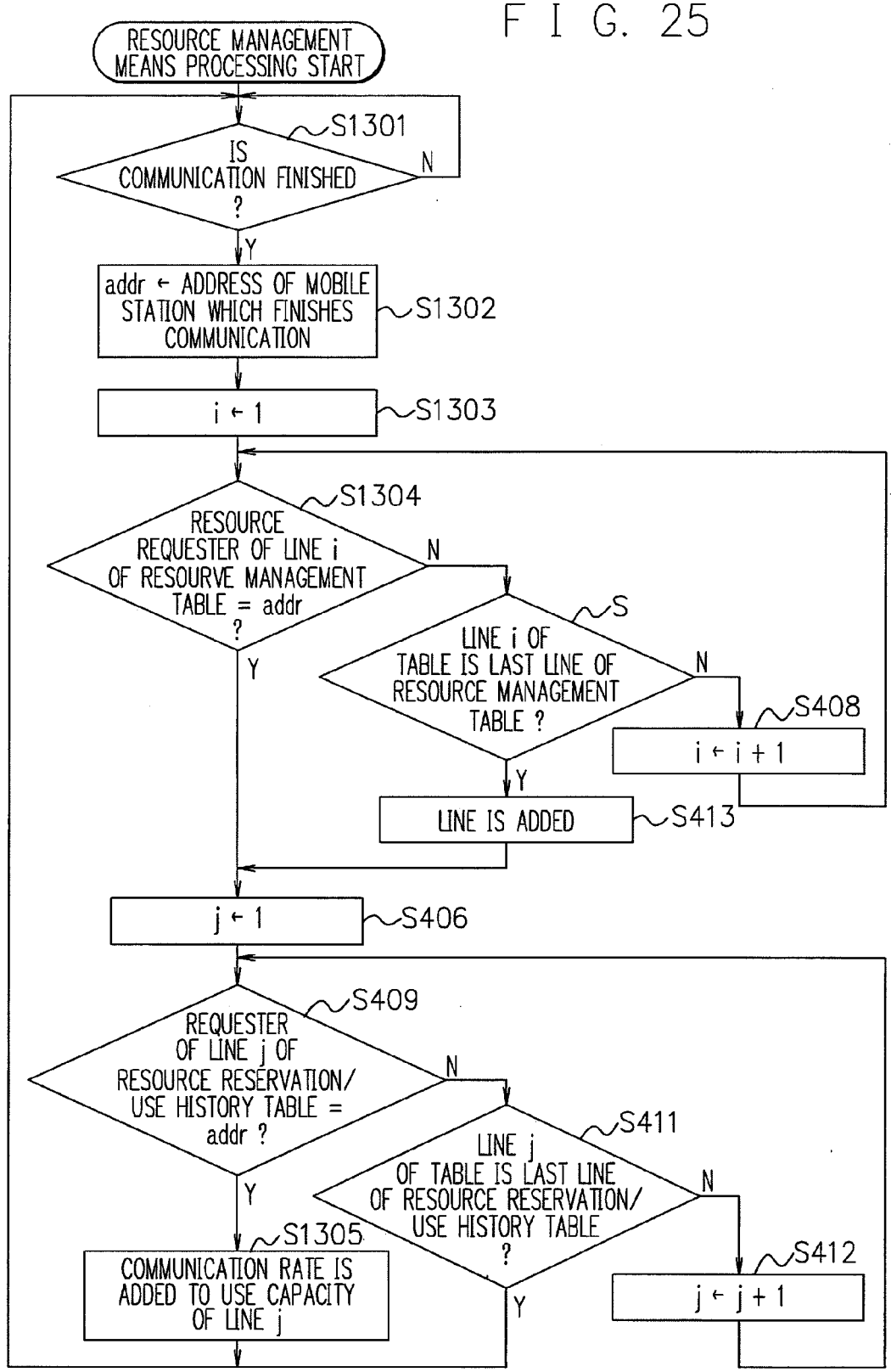
FIG. 25 is a flowchart illustrating an operation of the resource management means 312 according to the eighth exemplary embodiment of the present invention.

FIG. 25 is a flowchart illustrating an operation of the resource management means 312. Compared to FIG. 9, steps 401 to 405 are replaced with steps 1301 to 1304, and step 410 is replaced with step 1305.

When processing of a resource management means starts, it is investigated whether a mobile station which is performing a communication through a corresponding access point finishes a communication or not (step 1301). If a communication is finished, an address of a mobile station which finishes a communication is substituted to a variable "addr" (step 1302), whereas if a communication is not finished, processing returns to step 1301. After step 1302, one (1) is substituted to a variable "i" representing a line number of the communication rate table (step 1303). Then, it is investigated whether a requester address of a line i of the resource management table is identical to "addr" or not (step 1304). If identical, processing proceeds to step 406, whereas if not identical, processing proceeds to step 407.

If it is determined in step 409 that a requester address of the line j of the resource reservation/use history table is identical to "addr", a communication rate of an item of the communication table which is identical in requester address is added to a value of the used capacity of a line j of the resource reservation/use history table (step 1305), and processing returns to step 1301.

In the eighth exemplary embodiment of the present invention, an effective rate in which a retransmission is considered is used as a used capacity, but a communication rate containing, for example, an overhead of a protocol may be used as a used capacity. Also, the communication rate measuring means 501 and the communication rate database 502 belong to the SME portion 310, but they may belong to a portion of performing processing of a different protocol.

The eighth exemplary embodiment of the present invention has been described based on the first exemplary embodiment of the present invention but may applied to the second to seventh exemplary embodiments.

In an actual communication, there may be a case where a resource use capacity is smaller than a reserved capacity. In the eighth exemplary embodiment of the present invention, whether to accept a reservation or not is judged based on the resource use probability computed by dividing a total sum of resource capacities used when a communication is performed by a total sum of reserved resource capacities, and so an actually used capacity is considered, whereby there is an advantage of effectively using resources.

Ninth Exemplary Embodiment

In a ninth exemplary embodiment of the present invention, a communication apparatus which accepts a reservation uses a predetermined fixed value as the resource use probability until the resource reservation frequency reaches a certain value for each communication apparatus which performs a reservation.

Hereinafter, a communication apparatus which accepts a reservation is referred to as an access point, and a communication apparatus which performs a reservation is referred to as a mobile station. The ninth exemplary embodiment of the present invention will be described focusing on a wireless LAN system which includes an access point and a mobile station as an example.

In the ninth exemplary embodiment of the present invention, a basic configuration is similar to the first exemplary embodiment but is different from the first exemplary embodiment in operation of the resource reservation acceptance judging means 311 of the access points 101 to 107 shown in FIG. 3 and in operation of resource reservation/use history database probability acquisition processing.

Figure 26:
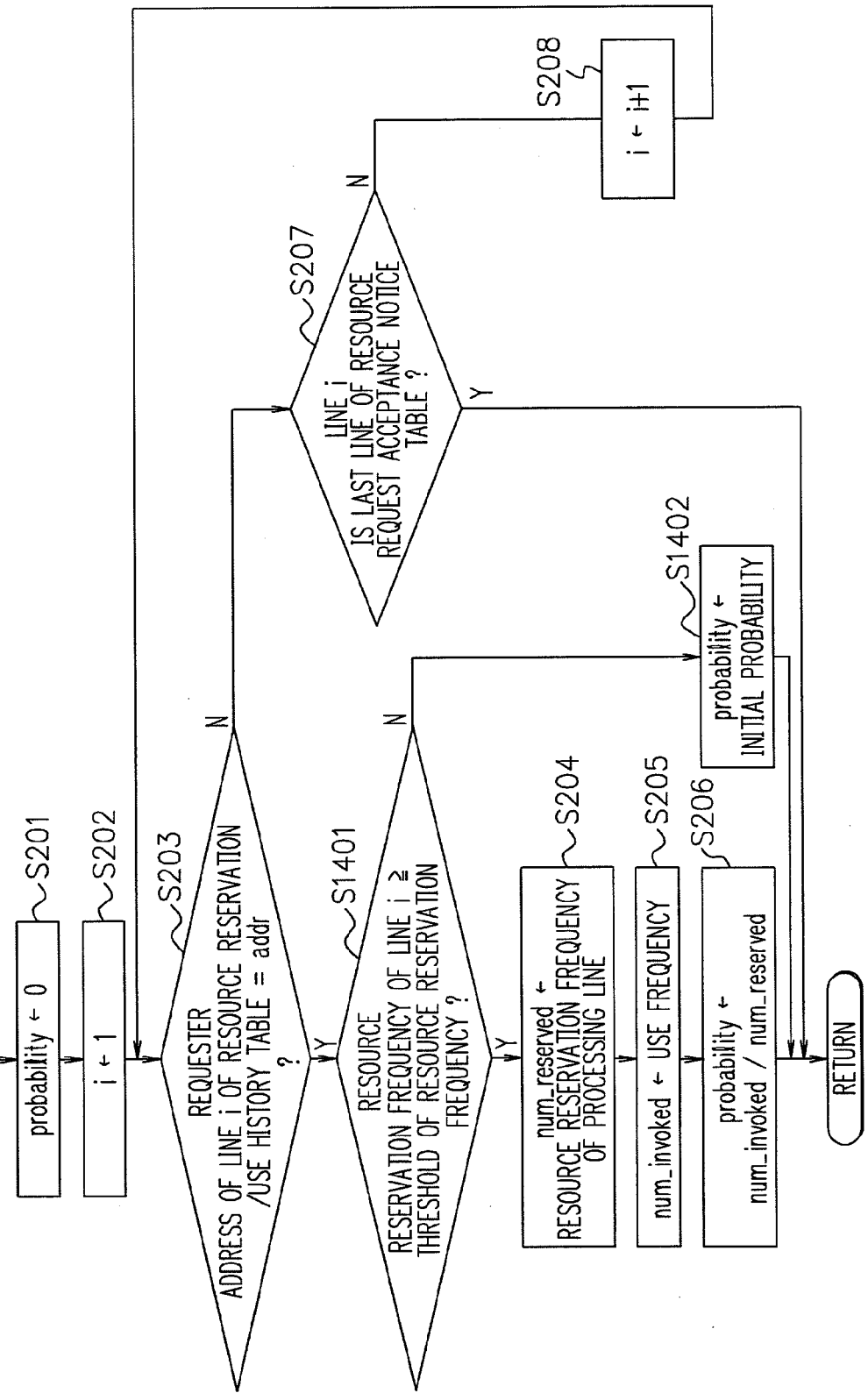
FIG. 26 is a flowchart illustrating an operation of resource reservation/use history database probability acquisition processing according to a ninth exemplary embodiment of the present invention.

FIG. 26 is a flowchart illustrating an operation of resource reservation/use history database probability acquisition processing. Compared to FIG. 7, steps 1401 and 1402 are added.

It is investigated in step 203 whether an address of a line i of the resource reservation/use history table is identical to "addr" or not. If identical, it is investigated whether the resource reservation frequency is equal to or more than a predetermined threshold of the reservation frequency or not (step 1401). If it is equal to or more than a predetermined threshold of the reservation frequency, processing proceeds to step 204, whereas if it is less than a predetermined threshold of the reservation frequency, a predetermined initial probability is substituted to a resource use probability "probability" (step 1402).

The ninth exemplary embodiment of the present invention has been described based on the first exemplary embodiment but may be applied to the second to eighth exemplary embodiments.

Also, in the ninth exemplary embodiment, the resource use probability is variable, but the acceptance threshold may be variable. In this instance, it can be applied to the first, second and fourth to eighth exemplary embodiments which use the acceptance threshold.

For example, since the number of times that a handover is performed by a mobile station is small directly after an access point is installed, the resource use probability is greatly changed by one time resource use. In the ninth exemplary embodiment of the present invention, the fixed resource use probability is used until the resource reservation frequency reaches a certain value, and thus there is an advantage of preventing the resource use probability with the low accuracy from being used.

In the first to ninth exemplary embodiments, the reservation state and the use state of the resources can be accumulated, but all of accumulated data do not need to be used, and these data may be reset periodically or by an event such as a manipulation of an operator. Therefore, there is an advantage of preventing the resource use probability with the low accuracy from being used since relatively new data are used by resetting.

The present invention can be applied to an access point of a wireless LAN and a base station of a wireless communication apparatus such as a base station of a portable telephone.

According to the present invention, a communication apparatus which accepts a resource reservation accepts a reservation based on the resource use probability of a communication apparatus which performs a resource reservation, whereby resources can be effectively reserved.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A communication apparatus which accepts a resource reservation requested by a requester apparatus, comprising;
    a resource reservation/use history table which includes, for each requester apparatus, a resource reservation state indicating a state of resource reservation having been reserved in the past and a resource use state indicating a use state of reserved resource having been actually used in the past;

a resource reservation acceptance judging portion for accepting a resource reservation request from the requester apparatus based on a resource use probability obtained by dividing a value indicated in the resource use state by a value indicated in the resource reservation state corresponding to the requester apparatus included in the resource reservation/use history table; and a resource management table which includes, for each requester apparatus, a request resource capacity requested by the requester apparatus and a resource use state indicating whether the request resource capacity is being used or being reserved, wherein the value indicated in the resource reservation state is the number of times that the resource reservation has been performed in the past, and the value indicated in the resource use state is the number of times that the reserved resource has been actually used in the past, and the resource reservation acceptance judging porting accepts the resource reservation request when the calculated resource use probability exceeds a predetermined reservation acceptance threshold value, and wherein the resource reservation acceptance judging portion takes a total sum of the request resource capacity being used, being reserved and being requested for all of the requester apparatuses in the resource management table when the calculated resource use probability exceeds a predetermined reservation acceptance threshold value, and accepts the resource reservation request when the total sum of the request resource capacities is less than a total resource capacity available in own communication apparatus.

2. A communication apparatus, which accepts a resource reservation requested by a requester apparatus, comprising:

a resource reservation/use history table which includes, for each requester apparatus, a resource reservation state indicating a state of resource reservation having been reserved in the past and a resource use state indicating a use state of reserved resources having been actually used in the past; and a resource reservation acceptance judging portion for accepting a resource reservation request from the requester apparatus based on a resource use probability obtained by dividing a value indicated in the resource use state by a value indicated in the resource reservation state corresponding to the requester apparatus included in the resource reservation/use history table, wherein the value indicated in the resource reservation state is the number of times that the resource reservation has been performed in the past, and the value indicated in the resource use state is the number of times that the reserved resource has been actually used in the past, and the resource reservation acceptance judging portion accepts the resource reservation request when the calculated resource use probability exceeds a predetermined reservation acceptance threshold value, and wherein the resource reservation acceptance judging portion takes total sum of the number of times that the resource reservation has been performed in the past for all the requester apparatuses included in the resource reservation state and takes total sum of the number of times that the reserved resource has been actually used in the past for all the requester apparatuses included in the resource use state, and calculates the resource use probability by dividing the total sum of the number of times that the reserved resource has been actually used in the past for all the requester apparatuses by the total sum of the number of times that the resource reservation has been performed in the past for all the requester apparatuses.

3. A communication apparatus, which accepts a resource reservation requested by a requester apparatus, comprising:

a resource reservation/use history table which includes, for each requester apparatus, a resource reservation state indicating a state of resource reservation having been reserved in the past and a resource use state indicating a use state of reserved resources having been actually used in the past; and a resource reservation acceptance judging portion for accepting a resource reservation request from the requester apparatus based on a resource use probability obtained by dividing a value indicated in the resource use state by a value indicated in the resource reservation state corresponding to the requester apparatus included in the resource reservation/use history table, wherein the value indicated in the resource reservation state is the number of times that the resource reservation has been performed in the past, and the value indicated in the resource use state is the number of times that the reserved resource has been actually used in the past, and the resource reservation acceptance judging portion accepts the resource reservation request when the calculated resource use probability exceeds a predetermined reservation acceptance threshold value, and wherein the resource reservation/use history table further includes a group indication for classifying each requester apparatus into a plurality of groups, and wherein the resource reservation acceptance judging portion takes total sum of the number of times that the resource reservation has been performed in the past for the requester apparatuses classified into the same group included in the resource reservation state and takes total sum of the number of times that the reserved resource has been actually used in the past for the requester apparatuses classified into the same group included in the resource use state, and calculates the resource use probability by dividing the total sum of the number of times that the reserved resource has been actually used in the past for the requester apparatuses classified into the same group by the total sum of the number of times that the resource reservation has been performed in the past for the requester apparatuses classified into the same group.

4. The communication apparatus according to claim 3, wherein the resource reservation acceptance judging portion changes the reservation acceptance threshold value according to the classified group when comparing the calculated resource use probability for each group.

5. A communication apparatus which accepts a resource reservation requested by a requester apparatus, comprising:

a resource reservation/use history table which includes, for each requester apparatus, a resource reservation state indicating a state of resource reservation having been reserved in the past and a resource use state indicating a use state of reserved resources having been actually used in the past; and a resource reservation acceptance judging portion for accepting a resource reservation request from the requester apparatus based on a resource use probability obtained by dividing a value indicated in the resource use state by a value indicated in the resource reservation state corresponding to the requester apparatus included in the resource reservation/use history table, wherein the value indicated in the resource reservation state is a total sum of resource capacities which has been reserved in the past, and the value indicated in the resource use state is a total sum of resource capacities which has been actually used in the past, and the resource reservation acceptance judging portion accepts the resource reservation request when the calculated resource use probability exceeds a predetermined reservation acceptance threshold value.

6. A communication apparatus which accepts a resource reservation requested by a requester apparatus, comprising:
a resource reservation/use history table which includes, for each requester apparatus, a resource reservation state indicating a state of resource reservation having been reserved in the past and a resource use state indicating a use state of reserved resources having been actually used in the past;
a resource management table which includes, for each requester apparatus, a request resource capacity requested by the requester apparatus and a resource use state indicating whether the request resource capacity is being used or being reserved, and
a resource reservation acceptance judging portion for obtaining a resource use probability by dividing a value indicated in the resource use state by a value indicated in the resource reservation state corresponding to the requester apparatus included in the resource reservation/use history table, taking a total sum of the request resource capacity being used, being reserved and being requested for all of the requester apparatuses in the resource management table, wherein the request resource capacity being requested is an expected value of the requested resource capacity calculated by multiplying the requested resource capacity for all of the apparatuses by the resource use probability, and accepting the resource reservation request when the total sum of the request resource capacities is less than a total resource capacity available in own communication apparatus.

7. A method for accepting a resource reservation requested by a requester apparatus in a communication apparatus comprising:
providing a resource reservation/use history table which includes, for each requester apparatus, a resource reservation state indicating a state of resource reservation having been reserved in the past and a resource use state indicating a use state of reserved resources having been actually used in the past; and
judging for accepting a resource reservation request from the requester apparatus based on a resource use probability obtain by dividing a value indicated in the resource use state by a value indicated in the resource reservation state corresponding to the requester apparatus including in the resource reservation/use history table,
wherein the value indicated in the resource reservation state is the number of times that the resource reservation has been performed in the past, and the value indicated in the resource use state is the number of times that the reserved resource has been actually used in the past, and further comprising:
obtaining the resource use probability by dividing the number of times that the reserved resource has been actually used in the past by the number of times that the resource reservation has been performed in the past;
accepting the resource reservation request when the calculated resource use probability exceeds a predetermined reservation acceptance threshold value;
providing a resource management table which includes, for each requester apparatus, a request resource capacity requested by the requester apparatus and a resource use state indicating whether the request resource capacity is being used or being reserved;
taking a total sum of the request resource capacity being used, being reserved and being requested for all of the requester apparatuses in the resource management table when the calculated resource use probability exceeds a predetermined reservation acceptance threshold value; and
accepting the resource reservation request when the total sum of the request resource capacities is less than a total resource capacity available in own communication apparatus.

8. The method for accepting a resource reservation requested by a requester apparatus in a communication apparatus comprising:
providing a resource reservation/use history table which includes, for each requester apparatus, a resource reservation state indicating a state of resource reservation having been reserved in the past and a resource use state indicating a use state of reserved resources having been actually used in the past; and
judging for accepting a resource reservation request from the requester apparatus based on a resource use probability obtain by dividing a value indicated in the resource use state by a value indicated in the resource reservation state corresponding to the requester apparatus including in the resource reservation/use history table, and
wherein the value indicated in the resource reservation state is the number of times that the resource reservation has been performed in the past, and the value indicated in the resource use state is the number of times that the reserved resource has been actually used in the past, further comprising;
taking total sum of the number of times that the resource reservation has been performed in the past for all the requester apparatuses included in the resource reservation state;
taking total sum of the number of times that the reserved resource has been actually used in the past for all the requester apparatuses included in the resource use state;
calculating the resource use probability by dividing the total sum of the number of times that the reserved resource has been actually used in the past for all the requester apparatuses by the total sum of the number of times that the resource reservation has been performed in the past for all the requester apparatuses; and
accepting the resource reservation request when the calculated resource use probability exceeds a predetermined reservation acceptance threshold value.

9. The method according to claim 8, wherein the resource reservation/use history table further includes a group indication for classifying each requester apparatus into a plurality of groups, and further comprising;
taking total sum of the number of times that the resource reservation has been performed in the past for the requester apparatuses classified into the same group included in the resource reservation state;
taking total sum of the number of times that the reserved resource has been actually used in the past for the requester apparatuses classified into the same group included in the resource use state; and calculating the resource use probability by dividing the total sum of the number of times that the reserved resource has been actually used in the past for the requester apparatuses classified into the same group by the total sum of the number of times that the resource reservation has been performed in the past for the requester apparatuses classified into the same group.

10. The method according to claim 9, further comprising:
changing the reservation acceptance threshold value according to the classified group when comparing the calculated resource use probability for each group.

11. The method for accepting a resource reservation requested by a requester apparatus in a communication apparatus comprising:

providing a resource reservation/use history table which includes, for each requester apparatus, a resource reservation state indicating a state of resource reservation having been reserved in the past and a resource use state indicating a use state of reserved resources having been actually used in the past; and judging for accepting a resource reservation request from the requester apparatus based on a resource use probability obtain by dividing a value indicated in the resource use state by a value indicated in the resource reservation state corresponding to the requester apparatus including in the resource reservation/use history table, and wherein the value indicated in the resource reservation state is a total sum of resource capacities which has been reserved in the past, and the value indicated in the resource use state is a total sum of resource capacities which has been actually used in the past, and comprising:

accepting the resource reservation request when the calculated resource use probability exceeds a predetermined reservation acceptance threshold value.

12. A method for accepting a resource reservation requested by a requester apparatus in a communication apparatus, comprising:

providing a resource reservation/use history table which includes, for each requester apparatus, a resource reservation state indicating a state of resource reservation having been reserved in the past and a resource use state indicating a use state of reserved resources having been actually used in the past;

providing a resource management table which includes, for each requester apparatus, a request resource capacity requested by the requester apparatus and a resource use state indicating whether the request resource capacity is being used or being reserved;

obtaining a resource use probability by dividing a value indicated in the resource use state by a value indicated in the resource reservation state corresponding to the requester apparatus included in the resource reservation/use history table;

taking a total sum of the request resource capacity being used, being reserved and being requested for all of the requester apparatuses in the resource management table, wherein the request resource capacity being requested is an expected value of the requested resource capacity by multiplying the requested resource capacity for all of the requester apparatus by the resource use probability; and accepting the resource reservation request when the total sum of the request resource capacities is less than a total resource capacity available in own communication apparatus.

13. A non-transitory computer-readable medium having embodied thereon a computer program which causes the computer to execute the processing of a communication apparatus for accepting a resource reservation requested by a requester apparatus further comprising:

providing a resource reservation/use history table which includes, for each requester apparatus, a resource reservation state indicating a state of resource reservation having been reserved in the past and a resource use state indicating a use state of reserved resources having been actually used in the past; and judging for accepting a resource reservation request from the requester apparatus based on a resource use probability obtain by dividing a value indicated in the resource use state by a value indicated in the resource reservation state corresponding to the requester apparatus including in the resource reservation/use history table, and wherein the value indicated in the resource reservation state is the number of times that the resource reservation has been performed in the past, and the value indicated in the resource use state is the number of times that the reserved resource has been actually used in the past, and further comprising:

obtaining the resource use probability by dividing the number of times that the reserved resource has been actually used in the past by the number of times that the resource reservation has been performed in the past;

accepting the resource reservation request when the calculated resource use probability exceeds a predetermined reservation acceptance threshold value;

providing a resource management table which includes, for each requester apparatus, a request resource capacity requested by the requester apparatus and a resource use state indicating whether the request resource capacity is being used or being reserved;

taking a total sum of the request resource capacity being used, being reserved and being requested for all of the requester apparatuses in the resource management table when the calculated resource use probability exceeds a predetermined reservation acceptance threshold value; and accepting the resource reservation request when the total sum of the request resource capacities is less than a total resource capacity available in own communication apparatus.

14. A non-transitory computer-readable medium having embodied thereon a computer program which causes the computer to execute the process of a communication apparatus for accepting a resource reservation requested by a requester apparatus comprising:

providing a resource reservation/use history table which includes, for each requester apparatus, a resource reservation state indicating a state of resource reservation having been reserved in the past and a resource use state indicating a use state of reserved resources having been actually used in the past; and judging for accepting a resource reservation request from the requester apparatus based on a resource use probability obtain by dividing a value indicated in the resource use state by a value indicated in the resource reservation state corresponding the requester apparatus included in the resource reservation/use history table, wherein the value indicated in the resource reservation state is the number of times that the resource reservation has been performed in the past, and the value indicated in the resource use state is the number of times that the reserved resource has been actually used in the past, further comprising:

taking total sum of the number of times that the resource reservation has been performed in the past for all the requester apparatuses included in the resource reservation state;

taking total sum of the number of times that the reserved resource has been actually used in the past for all the requester apparatuses included in the resource use state;

calculating the resource use probability by dividing the total sum of the number of times that the reserved resource has been actually used in the past for all the requester apparatuses by the total sum of the number of times that the resource reservation has been performed in the past for all the requester apparatuses; and accepting the resource reservation request when the calculated resource use probability exceeds a predetermined reservation acceptance threshold value.

15. The non-transitory computer-readable medium according to claim 14, wherein the resource reservation/use history table further includes a group indication for classifying each requester apparatus into a plurality of groups, and further comprising:

taking total sum of the number of times that the reserved resource has been actually used in the past for the requester apparatuses classified into the same group included in the resource use state; and calculating the resource use probability by dividing the total sum of the number of times that the reserved resource has boon actually used in the past for the requester apparatuses classified into the same group by the total sum of the number of times that the resource reservation has been performed in the past for the requester apparatuses classified into the same group.

16. The non-transitory computer-readable medium according to claim 15, further comprising:

changing the reservation acceptance threshold value according to the classified group when comparing the calculated resource use probability for each group.

17. A non-transitory computer-readable medium having embodied thereon a computer program which causes the computer to execute the process of a communication apparatus for accepting a resource reservation requested by a requester apparatus comprising:

providing a resource reservation/use history table which includes, for each requester apparatus, a resource reservation state indicating a state of resource reservation having been reserved in the past and a resource use state indicating a use state of reserved resources having been actually used in the past; and judging for accepting a resource reservation request from the requester apparatus based on a resource use probability obtain by dividing a value indicated in the resource use state by a value indicated in the resource reservation state corresponding the requester apparatus included in the resource reservation/use history table, wherein the value indicated in the resource reservation state is a total sum of resource capacities which has been reserved in the past, and the value indicated in the resource use state is a total sum of resource capacities which has been actually used in the past, and comprising:

accepting the resource reservation request when the calculated resource use probability exceeds a predetermined reservation acceptance threshold value.

18. A non-transitory computer-readable medium having embodied thereon a computer program which causes the computer to execute the processing of a communication apparatus for accepting a resource reservation requested by a requester apparatus comprising:

providing a resource reservation/use history table which includes, for each requester apparatus, a resource reservation state indicating a state of resource reservation having been reserved in the past and a resource use state indicating a use state of reserved resources having been actually used in the past;

providing a resource management table which includes, for each requester apparatus, a request resource capacity requested by the requester apparatus and a resource use state indicating whether the request resource capacity is being used or being reserved;

obtaining a resource use probability by dividing a value indicated in the resource use state by a value indicated in the resource reservation state corresponding to the requester apparatus included in the resource reservation/use history table;

taking a total sum of the request resource capacity being used, being reserved and being requested for all of the requester apparatuses in the resource management table, wherein the request resource capacity being requested is an expected value of the requested resource capacity calculated by multiplying the requested resource capacity for all of the requester apparatuses by the resource use probability; and accepting the resource reservation request when the total sum of the request resource capacities is less than a total resource capacity available in own communication apparatus.

* * * * *